(12) United States Patent
Yamamoto et al.

(10) Patent No.: US 12,463,490 B2
(45) Date of Patent: Nov. 4, 2025

(54) MOTOR MODULE

(71) Applicant: Nidec Corporation, Kyoto (JP)

(72) Inventors: Hiroyuki Yamamoto, Kyoto (JP);
Yoichi Sekii, Kyoto (JP); Masahiro Otani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/103,605

(22) Filed: Jan. 31, 2023

(65) Prior Publication Data
US 2023/0246508 A1 Aug. 3, 2023

(30) Foreign Application Priority Data

Jan. 31, 2022 (JP) ................................ 2022-012706
Jan. 31, 2022 (JP) ................................ 2022-012763

(51) Int. Cl.
*H02K 3/52* (2006.01)
*A43B 7/06* (2006.01)
(Continued)

(52) U.S. Cl.
CPC ......... *H02K 3/522* (2013.01); *F04D 25/0673* (2013.01); *F04D 25/0693* (2013.01); *F04D 29/023* (2013.01); *H02K 11/0094* (2013.01); *H02K 11/33* (2016.01); *A43B 7/06* (2013.01); *F04D 17/16* (2013.01);
(Continued)

(58) Field of Classification Search
CPC .... H02K 3/522; H02K 11/0094; H02K 11/33; H02K 5/225; H02K 9/06; H02K 2203/06; H02K 2211/03; F04D 25/06; F04D 25/0673; F04D 25/0693; F04D 29/023; F04D 29/4206; F04D 17/16;
(Continued)

(56) References Cited

U.S. PATENT DOCUMENTS

| 7,976,293 B2 * | 7/2011 | Kusano | ............... F04D 25/0633 417/423.1 |
| 11,333,152 B2 * | 5/2022 | Kuratani | ............. F04D 13/0673 |

(Continued)

FOREIGN PATENT DOCUMENTS

| CN | 2251746 Y | 4/1997 |
| CN | 202673781 U | 1/2013 |

(Continued)

OTHER PUBLICATIONS

JP2018014869A translation (Year: 2024).*
(Continued)

*Primary Examiner* — David N Brandt
(74) *Attorney, Agent, or Firm* — Keating & Bennett, LLP

(57) ABSTRACT

A motor module includes a motor and a casing including a partition wall. The accommodation space includes first and second accommodation spaces. The partition wall includes a base that partitions the first and second accommodation spaces in an axial direction. The base includes a wiring including a lead-out port and a guide groove extending from the lead-out port. The lead wire is led out from the lead-out port and located in the guide groove. The casing includes a tape and a seal. The tape covers at least a portion of the wiring from below. The seal is located in at least a portion of a space defined by the wiring and the tape.

6 Claims, 21 Drawing Sheets

(51) Int. Cl.
  *F04D 17/16* (2006.01)
  *F04D 25/06* (2006.01)
  *F04D 25/08* (2006.01)
  *F04D 29/02* (2006.01)
  *F04D 29/40* (2006.01)
  *F04D 29/42* (2006.01)
  *H02K 5/22* (2006.01)
  *H02K 9/06* (2006.01)
  *H02K 11/00* (2016.01)
  *H02K 11/33* (2016.01)

(52) U.S. Cl.
  CPC .......... *F04D 25/0606* (2013.01); *F04D 25/08* (2013.01); *F04D 29/403* (2013.01); *F04D 29/422* (2013.01); *F04D 29/4226* (2013.01); *H02K 5/225* (2013.01); *H02K 9/06* (2013.01); *H02K 2203/06* (2013.01); *H02K 2211/03* (2013.01)

(58) Field of Classification Search
  CPC .... F04D 25/0606; F04D 25/08; F04D 29/403; F04D 29/422; F04D 29/4226; A43B 7/06
  See application file for complete search history.

(56) References Cited

U.S. PATENT DOCUMENTS

| | | | |
|---|---|---|---|
| 2012/0156022 | A1 | 6/2012 | Otsuki et al. |
| 2013/0028765 | A1* | 1/2013 | Yokozawa .............. F04D 13/06 417/423.14 |
| 2017/0284403 | A1* | 10/2017 | Hamano ............... F04D 19/002 |
| 2018/0066664 | A1* | 3/2018 | Chen .................. H05K 7/20136 |
| 2019/0133088 | A1* | 5/2019 | Hurley .................... A61B 5/11 |

FOREIGN PATENT DOCUMENTS

| | | | | |
|---|---|---|---|---|
| CN | 202867341 | U | | 4/2013 |
| CN | 110735801 | A | | 1/2020 |
| JP | 2012013067 | A | | 1/2012 |
| JP | 2018014869 | A | * | 1/2018 |

OTHER PUBLICATIONS

Official Communication issued in corresponding Chinese Patent Application No. 202310104016.6, mailed on Jun. 21, 2025, 8 pages.

* cited by examiner

MOTOR MODULE

CROSS-REFERENCE TO RELATED APPLICATIONS

The present application claims priority under 35 U.S.C. § 119 to Japanese Patent Application No. 2022-012763 and Japanese Patent Application No. 2022-012706, filed on Jan. 31, 2022, the entire contents of which are hereby incorporated herein by reference.

1. Field of the Invention

The present disclosure relates to a motor module.

2. Background

Conventionally, fans mounted on shoes are known. A conventional fan operates with a motor.

When the motor constituting the fan becomes large, it may be difficult to mount the fan on the shoe. Therefore, it is necessary to reduce the thickness of the motor.

SUMMARY

A motor module according to an example embodiment of the present disclosure includes a motor that is rotatable about a central axis extending vertically and a casing including an accommodation space. The motor includes a lead wire. The casing includes a partition wall that partitions the accommodation space into a plurality of sections. The accommodation space includes a first accommodation space to accommodate the motor and a second accommodation space including at least a space below the first accommodation space. The partition wall includes a base that partitions the first accommodation space and the second accommodation space in the axial direction. The base includes a wiring. The wiring includes a lead-out port that penetrates the base in the axial direction and a guide groove that is recessed upward from a lower surface of the base and extends radially outward from the lead-out port. The lead wire is led out from the lead-out port, located in the guide groove, and extends radially outward along the guide groove. The casing further includes a tape and a seal. The tape is bonded to the lower surface of the base and covers at least a portion of the wiring from below. The seal is located in at least a portion of a space partitioned by the wiring and the tape.

A motor module according to an example embodiment of the present disclosure includes a motor that is rotatable about a central axis extending vertically, an impeller that is rotatable integrally with the motor, a board to control the motor, and a casing including an accommodation space. The casing includes an inlet port that opens in an axial direction of the impeller and an exhaust port that opens radially outward of the impeller. The casing includes a partition wall that partitions the accommodation space into a plurality of sections. The accommodation space includes a motor accommodation space that accommodates the motor and the impeller and a board accommodation space that accommodates the board. The board accommodation space is positioned radially outward of the motor accommodation space when viewed from the axial direction.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the accompanying drawings.

In the present specification, a direction in which a central axis CA of a motor 1 extends is simply referred to as an "axial direction", one side in the axial direction is defined as an upper side, and the other side in the axial direction is defined as a lower side. However, the definition of the upper and lower sides des not limit the orientation and positional relationship when a motor module 100 is used.

In addition, in the present specification, a radial direction centered on the central axis CA is simply referred to as a "radial direction", a direction approaching the central axis CA in the radial direction is simply referred to as a "radially inward", and a direction away from the central axis CA is simply referred to as a "radially outward". A circumferential direction centered on the center axis CA is simply referred to as a "circumferential direction".

Surfaces of each constituent element which respectively face the upper side and the lower side are referred to as an "upper surface" and a "lower surface". Surfaces of each constituent element which respectively face radially inward and radially outward are referred to as a "radially inner side surface" and a "radially outer side surface".

Figure 1:
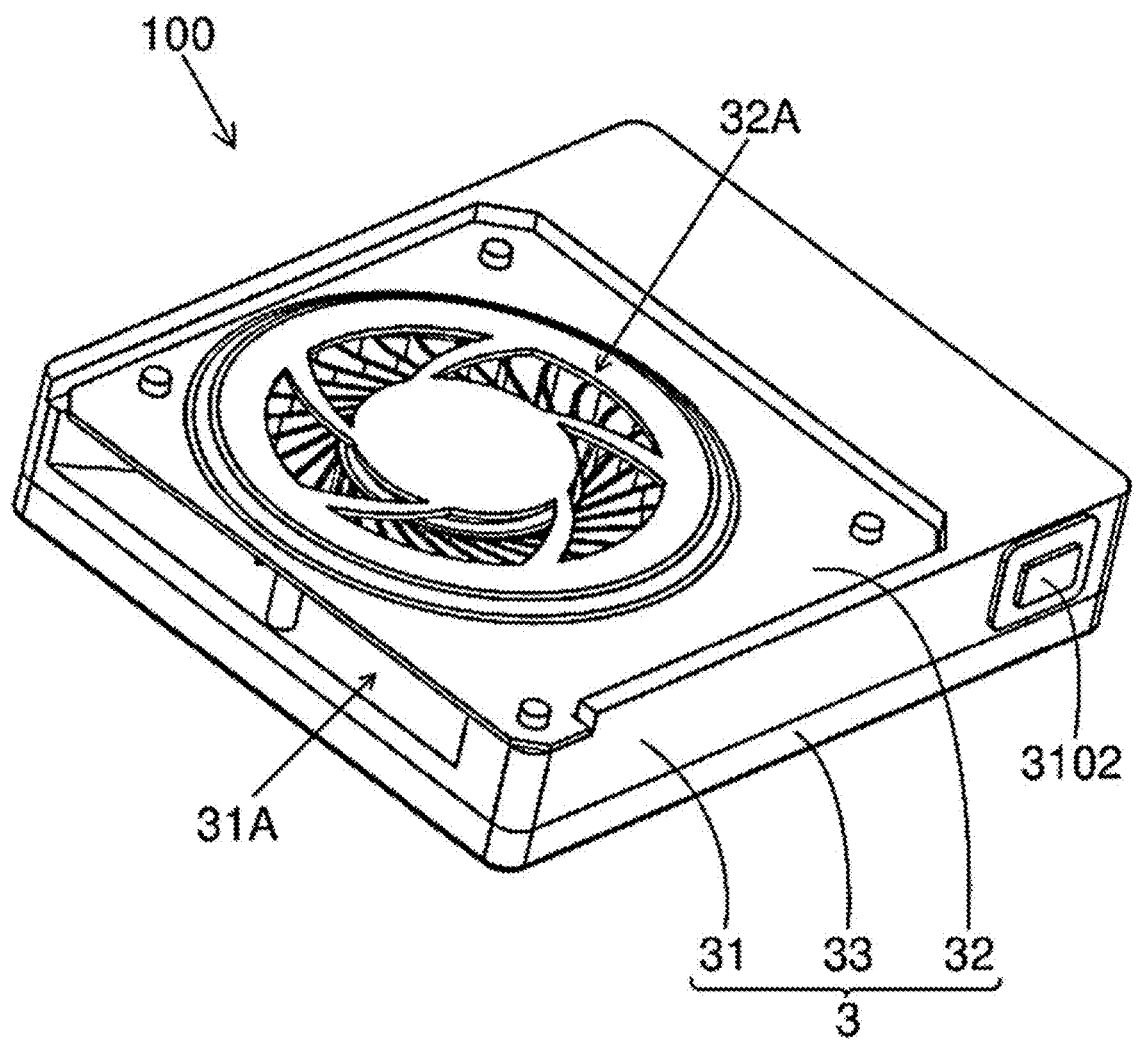
FIG. 1 is a perspective view of a motor module according to a first example embodiment of the present invention.
Figure 2:
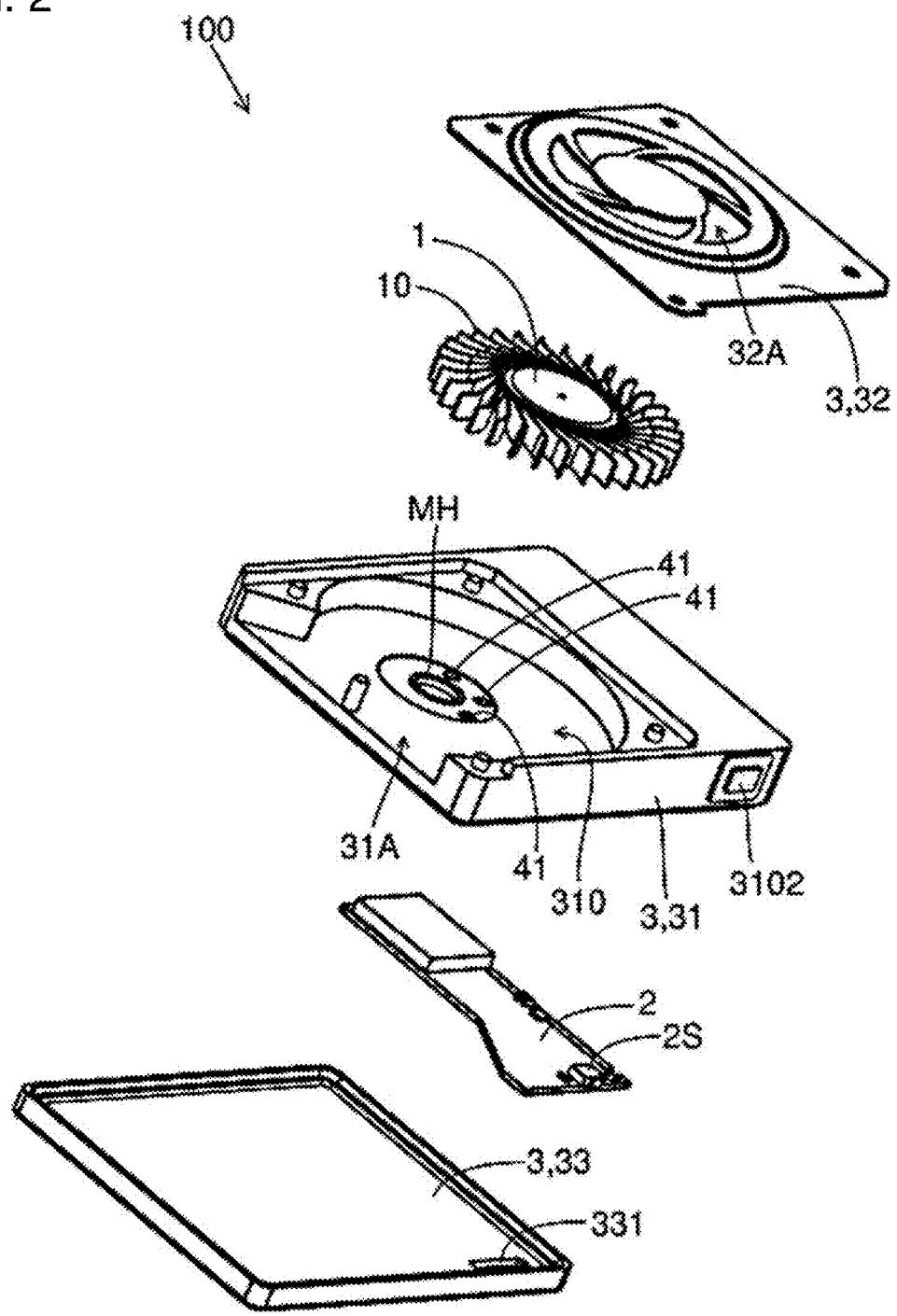
FIG. 2 is an exploded perspective view of the motor module according to the first example embodiment.
Figure 3:
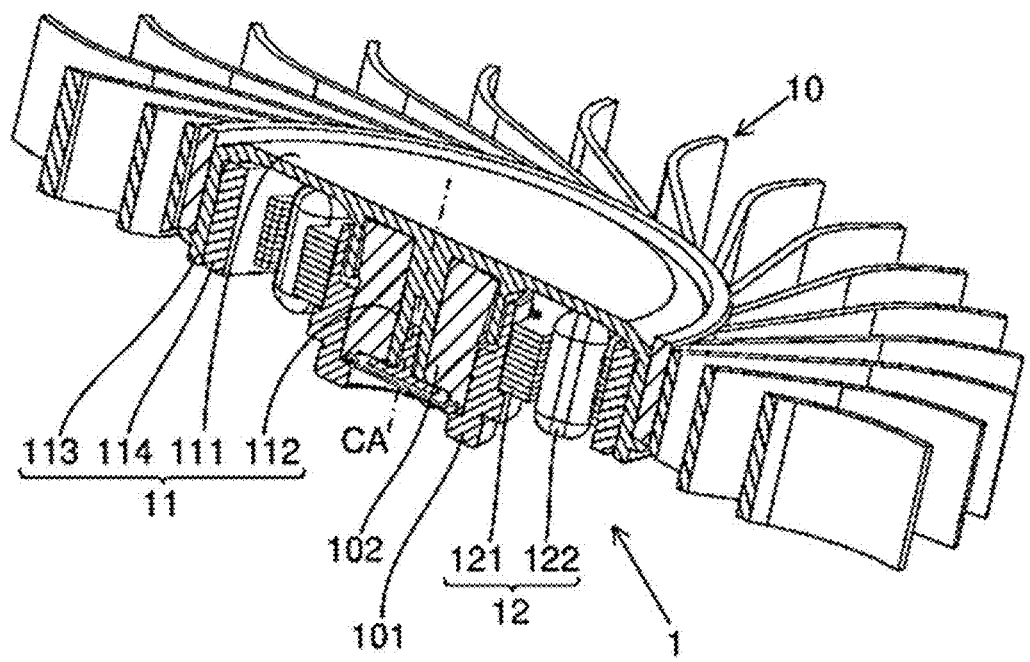
FIG. 3 is a cross-sectional perspective view of a motor and an impeller according to the first example embodiment.

FIG. 1 is a perspective view of the motor module 100 according to the first example embodiment. FIG. 2 is a perspective view of the motor module 100 according to the first example embodiment. FIG. 3 is a cross-sectional perspective view of the motor 1 and an impeller 10 according to the first example embodiment.

The motor module 100 according to the first example embodiment is a centrifugal fan. That is, the motor module 100 is a blower.

For example, the motor module 100 is mounted on a shoe. The motor module 100 is driven to circulate the air, thereby exhausting the air inside the shoe to the outside of the shoe. That is, the motor module 100 suppresses air stuffiness in the shoe. When the motor module 100 is mounted on a shoe, it is necessary to reduce the thickness of the motor module 100.

The motor module 100 includes the motor 1. The motor module 100 includes the impeller 10. The motor 1 rotates about the central axis CA extending vertically. The impeller 10 is located radially outward of the motor 1. The impeller 10 rotates integrally with the motor 1. More specifically, the impeller 10 rotates about the central axis CA integrally with a rotor 11. That is, the motor 1 rotates the impeller 10 about the central axis CA.

The motor 1 includes a holder 101. The holder 101 has a cylindrical shape centered on the central axis CA. The holder 101 includes a sleeve bearing 102. The sleeve bearing 102 is located radially inward of the holder 101.

The motor 1 includes the rotor 11 and a stator 12. The rotor 11 is rotatable about the central axis CA. The stator 12 rotates the rotor 11 about the central axis CA.

The rotor 11 has a covered tubular yoke. The yoke includes a yoke lid 111, a shaft portion 112, and a tubular portion 113. The yoke lid 111 has a disk shape centered on the central axis CA. The shaft portion 112 is located at the center of the yoke lid 111 and extends downward along the central axis CA. The tubular portion 113 extends downward from the radially outer end portion of the yoke lid 111.

The shaft portion 112 is located radially inward of the sleeve bearing 102. The sleeve bearing 102 rotatably holds the shaft portion 112. The tubular portion 113 has a magnet 114 located radially inward. The magnet 114 is located on the radially inner side surface of the tubular portion 113. The magnet 114 is an annular permanent magnet. The magnet 114 has N poles and S poles alternately in the circumferential direction. The impeller 10 is fixed to the radially outer side surface of the tubular portion 113.

The stator 12 includes a stator core 121. The stator core 121 is formed by stacking a plurality of electromagnetic steel plates in the axial direction. The stator core 121 has an annular shape centered on the central axis CA. The radially inner side surface of the stator core 121 is fixed to the radially outer side surface of the holder 101. The radially outer side surface of the stator core 121 faces the magnet 114 in the radial direction.

The stator 12 includes a coil 122. The coil 122 is formed by winding a conductive wire around the stator core 121. The motor 1 includes a lead wire Le (see FIG. 13). The lead wire Le is connected to the stator 12. The drive power of the motor 1 is supplied to the coil 122 via the lead wire Le.

The motor module 100 includes a board 2. Electronic components such as a switch 2S are mounted on the board 2. The board 2 controls the motor 1. In other words, the board 2 controls the rotation of the impeller 10. In other words, the board 2 controls power supply to the motor 1. The lead wire Le is connected to the board 2. The board 2 is connected to the motor 1 via the lead wire Le.

The ON/OFF state of the switch 2S is switched when the switch 2S is pressed. When the switch 2S is pressed, driving and stopping of the motor 1 (that is, the rotation and non-rotation of the impeller 10) are switched.

The rotational speed of the motor 1 may be switchable in multiple stages. For example, the rotational speed of the motor 1 may be switched by the number of times the switch 2S is pressed. Accordingly, the air volume can be adjusted by changing the number of times the switch 2S is pressed.

Figure 5:
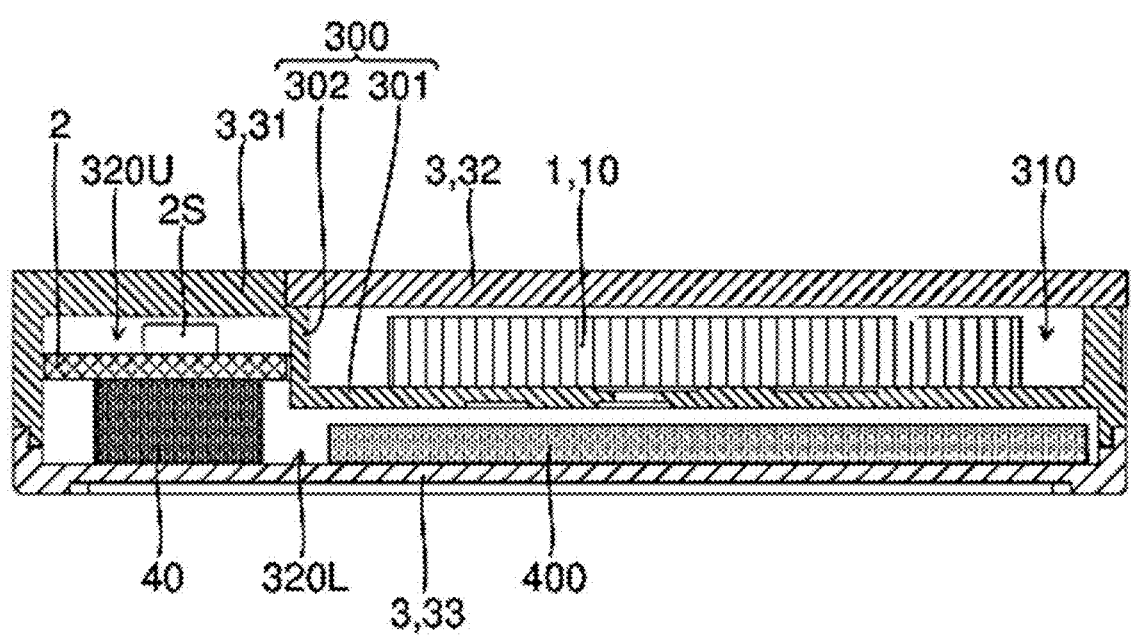
FIG. 5 is a cross-sectional view illustrating an accommodation space and each element accommodated in the accommodation space according to the first example embodiment.

The motor module 100 includes a battery 400 (see FIG. 5). The battery 400 supplies power to the motor 1. The board 2 controls power supply from the battery 400 to the motor 1.

A method of charging the battery 400 is not particularly limited. For example, the motor module 100 includes a power receiving coil 210 (see FIG. 11). This makes it possible to charge the battery 400 by using a wireless charger (not illustrated) including a power transmitting coil.

The motor module 100 includes a casing 3. The casing 3 has an accommodation space 30 (see FIG. 4). The accommodation space 30 will be described in detail later. The casing 3 includes a case body 31, a lid portion 32, and a bottom portion 33. The lid portion 32 is located above the case body 31 and closes the accommodation space 30 from above. The bottom portion 33 is located below the case body 31 and closes the accommodation space 30 from below.

The casing 3 accommodates the motor 1. The casing 3 accommodates the impeller 10. The casing 3 accommodates the board 2. Further, the casing 3 accommodates the battery 400.

Figure 4:
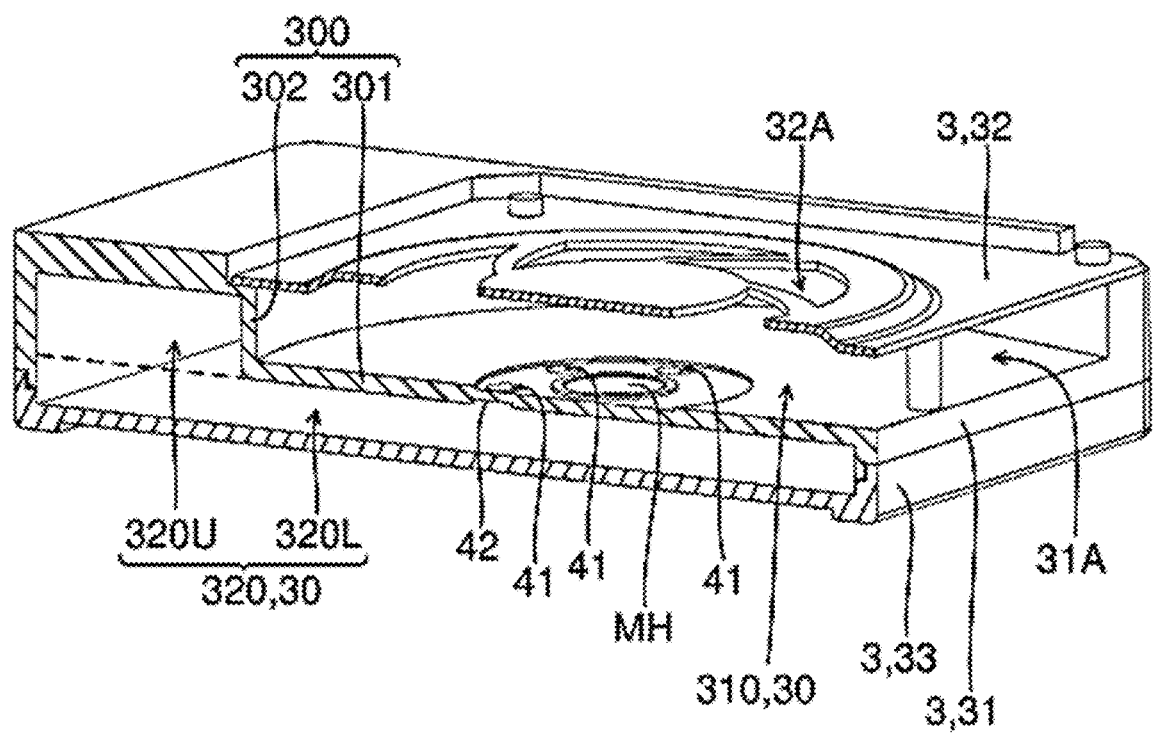
FIG. 4 is a cross-sectional perspective view of a casing according to the first example embodiment.

FIG. 4 is a cross-sectional perspective view of the casing 3 according to the first example embodiment. Referring to FIG. 4, the broken line indicates the boundary between an upper accommodation space 320U and a lower accommodation space 320L in the accommodation space 30 of the casing 3. FIG. 5 is a cross-sectional view illustrating the accommodation space 30 and each element accommodated therein according to the first example embodiment.

The casing 3 has a partition wall portion 300 that partitions the accommodation space 30 into a plurality of sections. The accommodation space 30 is partitioned into a plurality of spaces by the partition wall portion 300.

More specifically, the accommodation space 30 has a first accommodation space 310 that accommodates the motor 1. In other words, the accommodation space 30 has the first accommodation space 310 that accommodates the motor 1 and the impeller 10. The first accommodation space 310 corresponds to a "motor accommodation space". In the following description, the first accommodation space 310 is referred to as the motor accommodation space 310.

The casing 3 has an inlet port 32A that opens in the axial direction of the impeller 10. The inlet port 32A opens above the impeller 10, for example. The inlet port 32A is formed in the lid portion 32. The casing 3 also has an exhaust port 31A that opens radially outward of the impeller 10. When viewed radially outward, an opening is formed by the recess of the motor accommodation space 310 and the lid portion 32, and the opening is the exhaust port 31A.

The accommodation space 30 includes a second accommodation space 320. The second accommodation space 320 includes at least a space below the motor accommodation space 310. A space between the motor accommodation space 310 and the second accommodation space 320 in the axial direction is partitioned by the partition wall portion 300. More specifically, the partition wall portion 300 includes a base portion 301. The base portion 301 partitions the motor accommodation space 310 and the second accommodation space 320 in the axial direction. That is, the casing 3 has the partition wall portion 300 that partitions the motor accommodation space 310.

The base portion 301 is a plate-like portion expanding in the radial direction, and the axial direction is a plate thickness direction. The motor 1 and the impeller 10 are located above the base portion 301. The base portion 301 has a motor holding hole MH penetrating in the axial direction. The holder 101 is located radially inward of the motor holding hole MH. In other words, the radially outer side surface of the holder 101 is fixed to the radially inner side surface of the motor holding hole MH. In other words, the base portion 301 holds the motor 1.

The second accommodation space 320 has an upper accommodation space 320U. The upper accommodation space 320U is a space radially outward of the motor accommodation space 310 and axially above the lower surface of the base portion 301. The second accommodation space 320 has a lower accommodation space 320L. The lower accommodation space 320L includes a space below the upper accommodation space 320U and a space below the base portion 301.

A space between the motor accommodation space 310 and the upper accommodation space 320U in the axial direction is partitioned by the partition wall portion 300. More specifically, the partition wall portion 300 includes a vertical wall portion 302. The vertical wall portion 302 is erected from the base portion 301. The vertical wall portion 302 partitions the motor accommodation space 310 and the upper accommodation space 320U from each other in the radial direction. Accordingly, the motor accommodation space 310 is partitioned by the partition wall portion 300 when viewed from the axial direction.

The board 2 is accommodated in the second accommodation space 320. More specifically, the board 2 is accommodated in the upper accommodation space 320U. The battery 400 is located in the lower accommodation space 320L. The battery 400 is located below the base portion 301 in the lower accommodation space 320L. The battery 400 is fixed to the upper surface of the bottom portion 33.

Accommodating the board 2 in the upper accommodation space 320U makes it possible to widen the lower accommodation space 320L. That is, it is possible to increase a space in which the battery 400 is located. In this case, the capacity of the battery 400 increases as the size increases. Therefore, the capacity of the battery 400 can be increased by using the lower accommodation space 320L as the placement space of the battery 400.

The upper accommodation space 320U corresponds to a "board accommodation space". In the following description, the upper accommodation space 320U is referred to as the board accommodation space 320U.

In this case, the board accommodation space 320U is a space radially outward of the motor accommodation space 310. The motor accommodation space 310 and the board accommodation space 320U are arranged in the radial direction through the partition wall portion 300 when viewed from the axial direction. In other words, the accommodation space 30 has the board accommodation space 320U that accommodates the board 2. The board accommodation space 320U is positioned radially outward of the motor accommodation space 310 when viewed from the axial direction.

In this configuration, the motor 1 and the board 2 are aligned in the radial direction. By arranging the motor 1 and the board 2 so as to be aligned in the radial direction, the axial width of the casing 3 can be reduced as compared with the case where the motor 1 and the board 2 are arranged so as to overlap each other in the axial direction. As a result, the motor module 100 can be thinned. That is, the motor module 100 used as the centrifugal fan having the impeller 10 attached to the motor 1 can be thinned.

Figure 6:
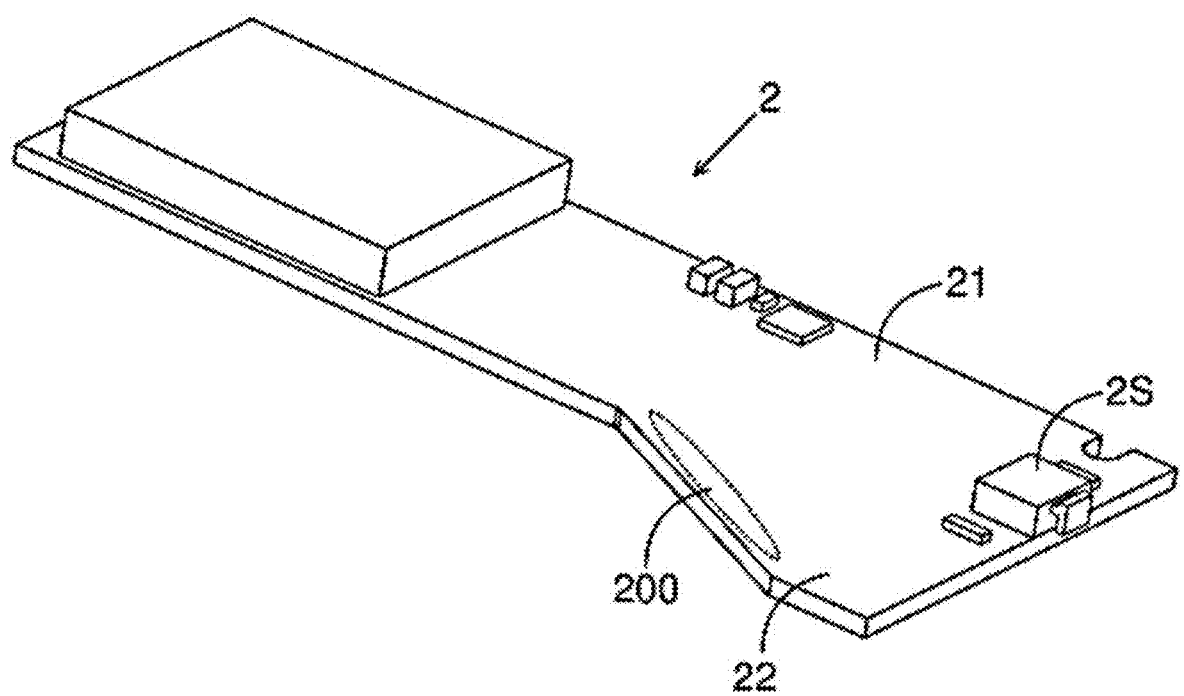
FIG. 6 is a perspective view of a board according to the first example embodiment.
Figure 7:
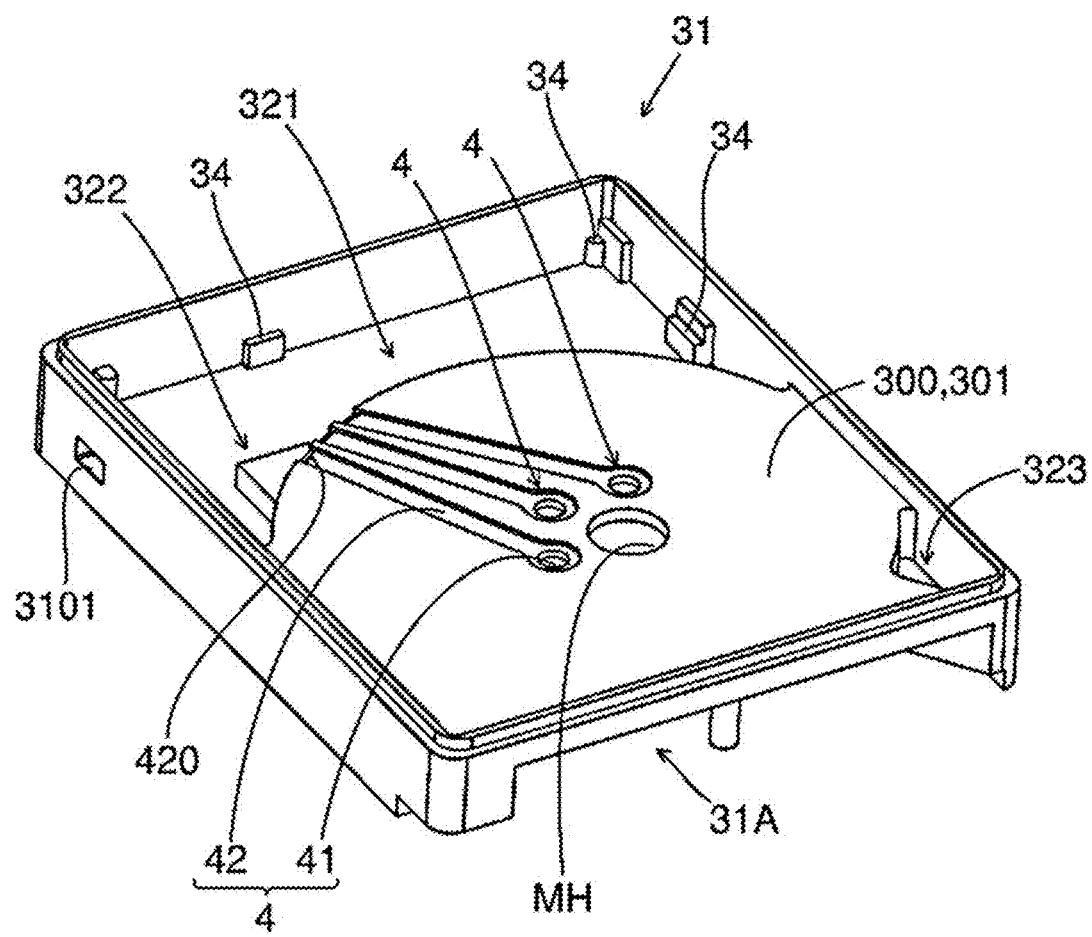
FIG. 7 is a perspective view of a case body according to the first example embodiment as viewed from below.
Figure 8:
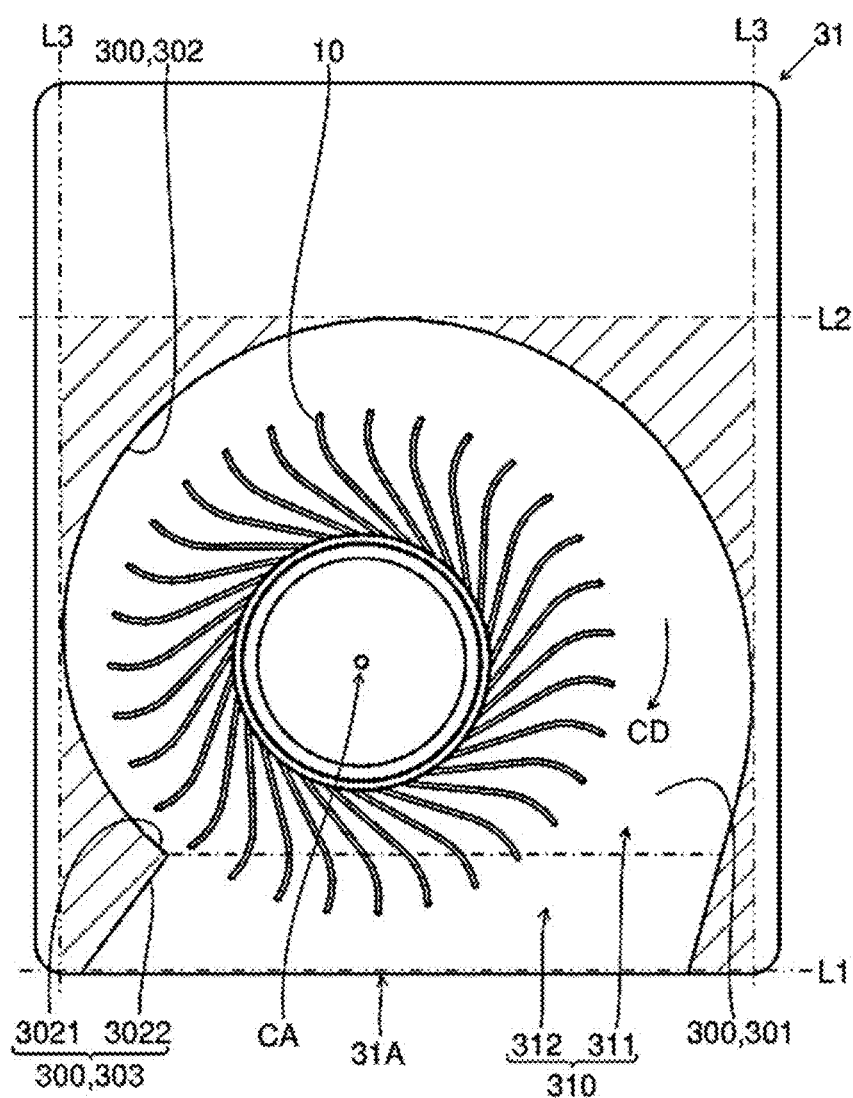
FIG. 8 is a plan view of the case body according to the first example embodiment as viewed from above.
Figure 9:
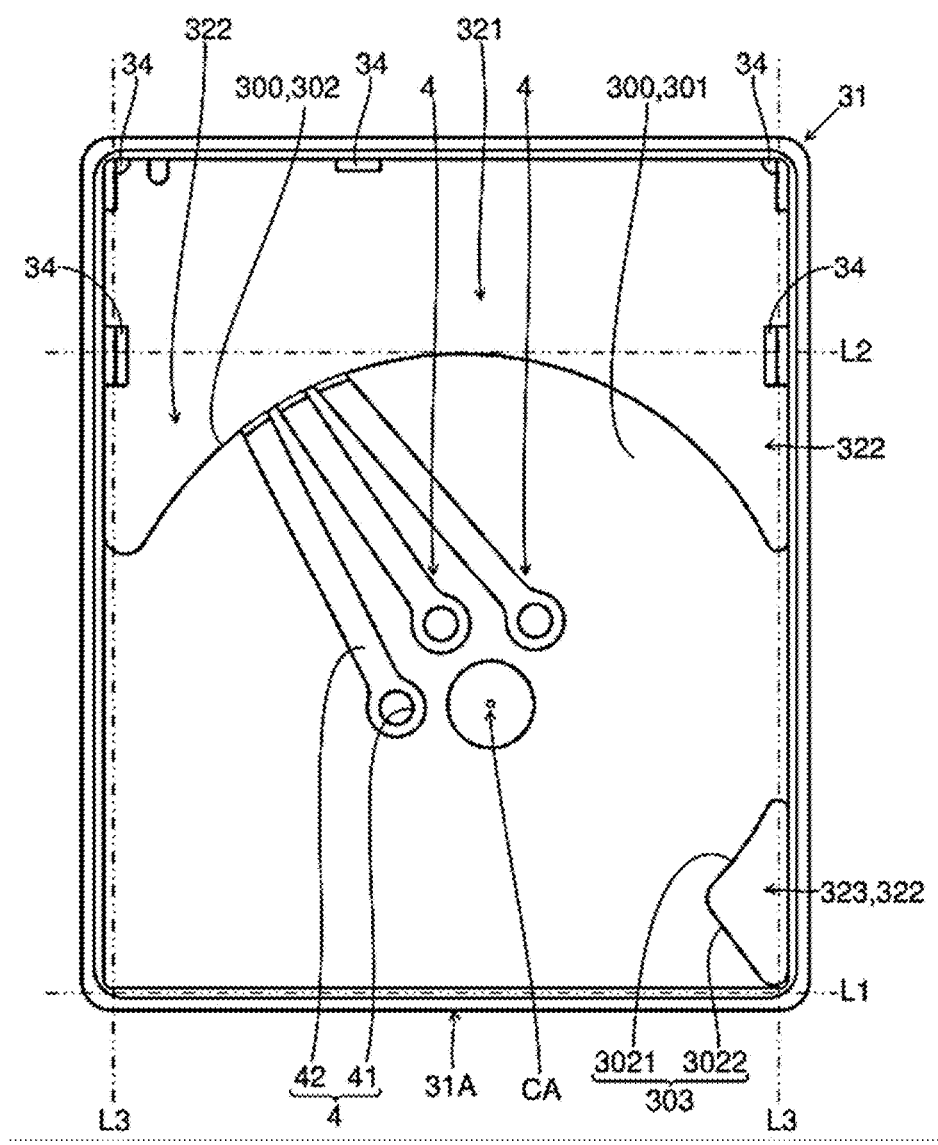
FIG. 9 is a plan view of the case body according to the first example embodiment as viewed from below.
Figure 10:
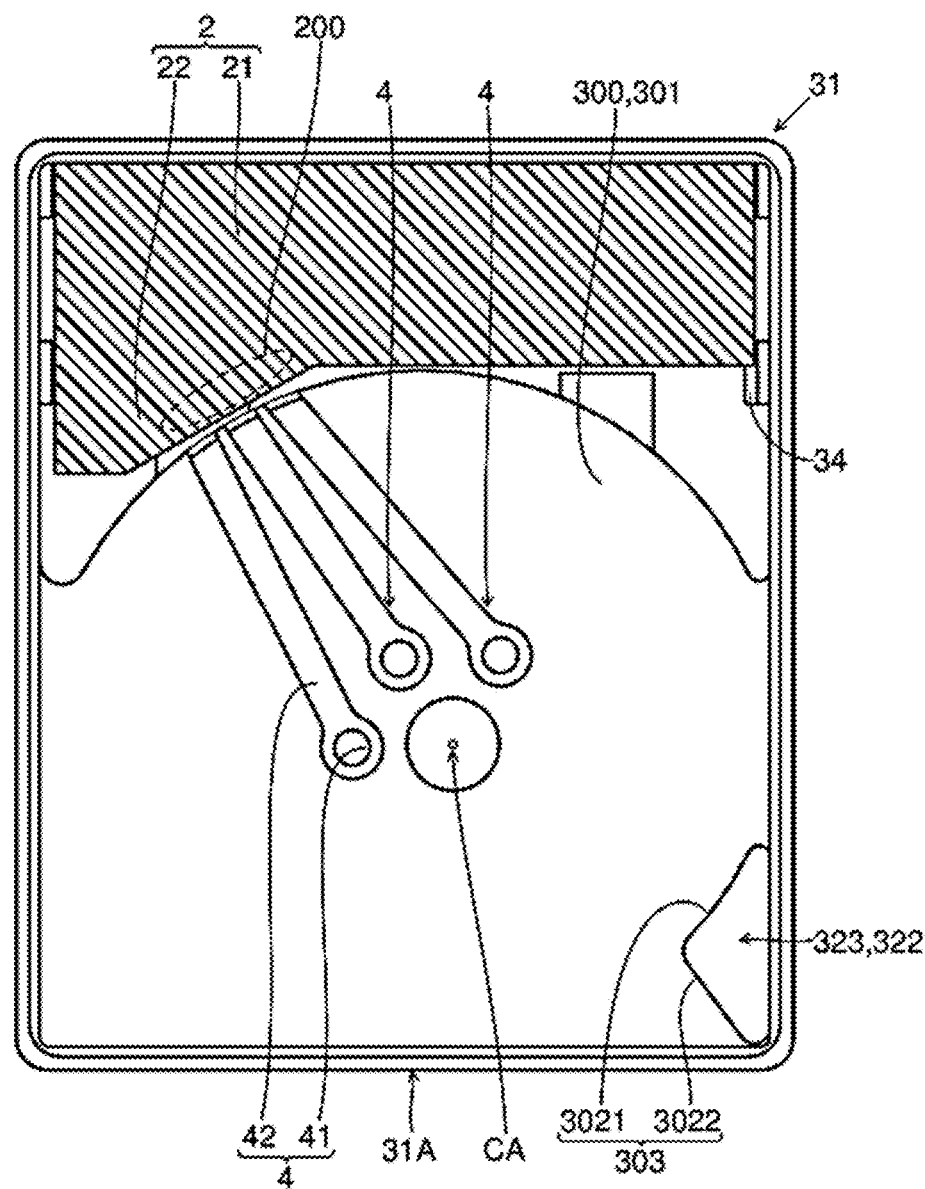
FIG. 10 is a plan view of a state in which a board is located on the case body according to the first example embodiment as viewed from below.
Figure 11:
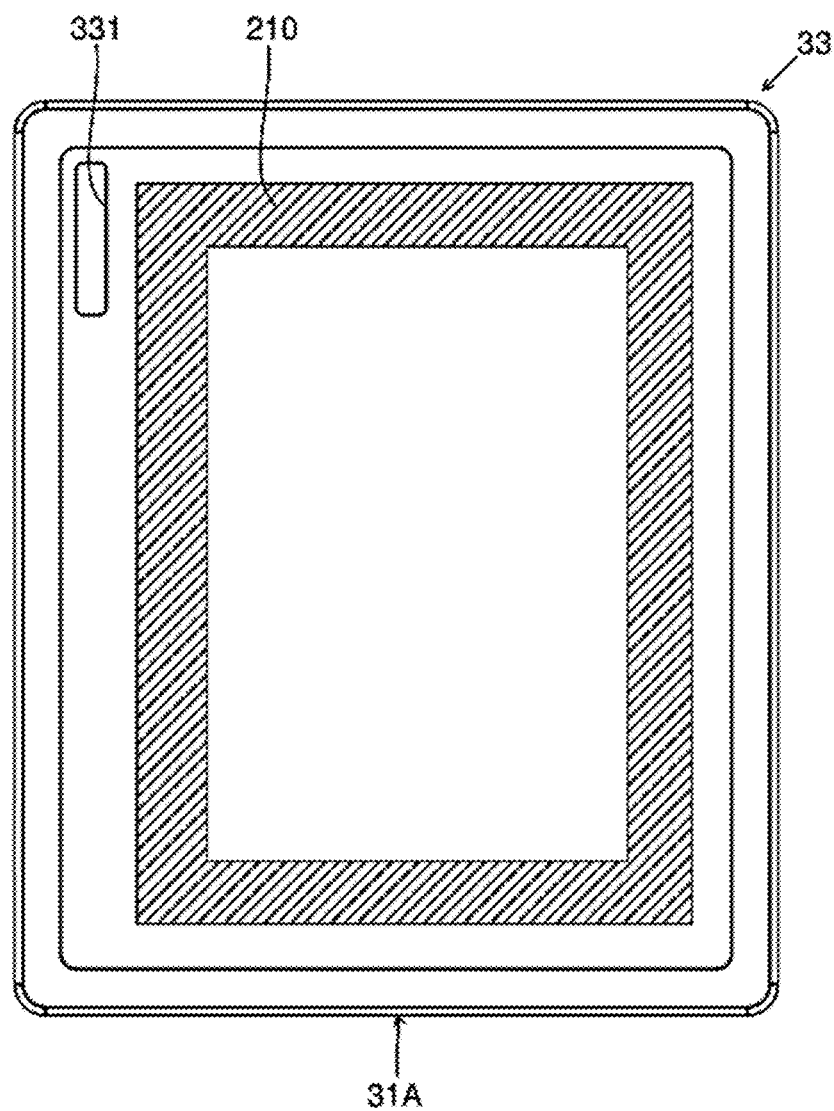
FIG. 11 is a plan view of a bottom portion according to the first example embodiment as viewed from below.

FIG. 6 is a perspective view of the board 2 according to the first example embodiment. FIG. 7 is a perspective view of the case body 31 according to the first example embodiment as viewed from below. FIG. 8 is a plan view of the case body 31 according to the first example embodiment as viewed from above. FIG. 8 illustrates the impeller 10 and indicates the flow path of air caused by the rotation of the impeller 10 with an arrow CD. Air flows in the direction indicated by the arrow CD. That is, the impeller 10 rotates in the direction indicated by the arrow CD. FIG. 9 is a plan view of the case body 31 according to the first example embodiment as viewed from below. FIG. 10 is a plan view of a state in which the board 2 is located on the case body 31 according to the first example embodiment as viewed from below. FIG. 11 is a plan view of the bottom portion 33 according to the first example embodiment as viewed from below. FIG. 11 illustrates the power receiving coil 210.

The motor accommodation space 310 has a space 311. The space 311 includes the flow path of air flowing by the rotation of the impeller 10 in the circumferential direction. That is, the space 311 includes a flow path indicated by an arrow CD in FIG. 8. The motor accommodation space 310 has a space 312. The space 312 includes a flow path from the space 311 toward the exhaust port 31A. Referring to FIG. 8, the boundary between the space 311 and the space 312 when viewed from above is indicated by the one-dot chain line.

In this case, the partition wall portion 300 partitioning the motor accommodation space 310 has a tongue portion 303. The tongue portion 303 is a portion located on a line extending along the boundary between the space 311 and the space 312 when viewed from above and is a portion protruding to the inside of the motor accommodation space 310. In other words, the tongue portion 303 is a portion that protrudes toward the inside of the motor accommodation space 310 along the outer peripheral edge of the impeller 10 on the exhaust port 31A side with respect to the central axis CA when viewed from above.

When viewed from above, the vertical wall portion 302 includes a first wall portion 3021 extending in a curved shape in the circumferential direction along the outer peripheral edge of the impeller 10 and a second wall portion 3022 extending from a portion of the first wall portion 3021 which most protrudes to one side (right side in FIG. 8) in the left-right direction to an end of the exhaust port 31A which is located on the other side (left side in FIG. 8) in the left-right direction. The tongue portion 303 is formed by the first wall portion 3021 and the second wall portion 3022 when viewed from above.

The outer shape of the casing 3 has four side surfaces when viewed from the axial direction. The exhaust port 31A is formed in one of the four surfaces. In the following description, a direction parallel to a surface having the exhaust port 31A among the four side surfaces when the casing 3 is viewed from the axial direction is defined as a left-right direction.

A straight line L1 passing through the left and right end portions of the exhaust port 31A when viewed from the axial direction is defined as a first virtual straight line. A straight line L2 that is parallel to the first virtual straight line L1 and is in contact with the partition wall portion 300 on the opposite side of the central axis CA to the exhaust port 31A is defined as a second virtual straight line L2. A straight line L3 perpendicular to the first virtual straight line L1 and in contact with the partition wall portion 300 on each of the left and right sides of the central axis CA is defined as a third virtual straight line. Referring to FIGS. 8 and 9, the first virtual straight line L1, the second virtual straight line L2, and the third virtual straight line L3 are indicated by the two-dot chain lines.

The board accommodation space 320U has an opposite side space 321 that is a space on the side opposite of the second virtual straight line L2 to the exhaust port 31A when viewed from the axial direction. The opposite side space 321 has a rectangular shape (including a substantially rectangular shape) when viewed from the axial direction.

At least a part of the board accommodation space 320U is provided in a motor outer peripheral space 322 surrounded by the first virtual straight line L1, the second virtual straight line L2, the third virtual straight line L3, and the partition wall portion 300 when viewed from the axial direction. At least a part of the board 2 is located in the motor outer peripheral space 322. Referring to FIG. 8, when viewed from the axial direction, the space surrounded by the first virtual straight line L1, the second virtual straight line L2, the third virtual straight line L3, and the partition wall portion 300 is indicated by the hatching.

The board 2 has a rectangular (including substantially rectangular) main portion 21 and a protruding portion 22 protruding from the main portion 21 when viewed from the axial direction. The main portion 21 is located in the opposite side space 321, and the protruding portion 22 is located in the motor outer peripheral space 322. As a result, the motor outer peripheral space 322 can be effectively used. In other words, the mounting area of the board 2 can be increased without increasing the size of the motor module 100.

The switch 2S is mounted on the main portion 21. In order to enable the switch 2S to be operated from the outside, the casing 3 has an operation window 3101. The operation window 3101 is formed in the case body 31 and opens outward from the opposite side space 321. A portion of the switch 2S which is pressed is located in the operation window 3101. Accordingly, the switch 2S can be operated via the operation window 3101. The operation window 3101 is covered with a rubber switch cover 3102 (see FIGS. 1 and 2). This can suppress the intrusion of moisture, dust, and the like into the casing 3.

The board 2 has a connection portion 200 to which the lead wire Le of the motor 1 is connected. The connection portion 200 is located on the lower surface of the board 2. Referring to FIG. 6, the lower surface of the board 2 is not illustrated. For this reason, a portion of the upper surface of the board 2 which overlaps the connection portion 200 in the axial direction is surrounded by the broken line to clarify the position of the connection portion 200.

The board 2 is positioned in the axial direction. More specifically, the casing 3 has a positioning portion 34 in contact with the upper surface of the board 2 in the board accommodation space 320U. This makes it possible to prevent the electronic components mounted on the upper surface of the board 2 from coming into contact with the casing 3. In this case, in the process of mounting the board 2 on the casing 3, the board 2 is mounted on the lower surface of the case body 31 facing upward. At this time, the board 2 can be positioned in the axial direction only by placing the board 2 on the positioning portion 34. This facilitates the mounting of the board 2 on the casing 3.

The motor module 100 includes a cushioning material 40 (see FIG. 5). For example, an elastic material such as sponge can be used as the cushioning material 40. In this case, the casing 3 has the bottom portion 33 below the board accommodation space 320U. The cushioning material 40 is then located on the upper surface of the bottom portion 33 and is in contact with the lower surface of the board 2. That is, the cushioning material 40 is sandwiched between the board 2 and the bottom portion 33 in the axial direction. As a result, since the board 2 is held in contact with the positioning portion 34, it is possible to reliably suppress the positional shift of the board 2 in the axial direction. In addition, the impact on the board 2 in the axial direction can be buffered.

The motor outer peripheral space 322 has a tongue space 323. The tongue space 323 is a space protruding toward the motor accommodation space 310 on the exhaust port 31A side with respect to the central axis CA when viewed from the axial direction. The tongue space 323 is a space located on the reverse surface side of the tongue portion 303 and has a shape reflecting the shape of the tongue portion 303. That is, the tongue space 323 is a space surrounded by the third virtual straight line L3 on one side (the right side in FIG. 9) in the left-right direction, the first wall portion 3021, and the second wall portion 3022 on the exhaust port 31A side with respect to the central axis CA when viewed from the axial direction.

The board 2 is not located in the tongue space 323. However, the present disclosure is not limited to this. At least a part of the board 2 may be located in the tongue space 323. When at least a part of the board 2 is located in the tongue space 323, a portion of the board 2 which is located in the tongue space 323 may be separated from the main portion 21.

In addition, a portion of the bottom portion 33 which closes the board accommodation space 320U has a through-hole 331. The through-hole 331 penetrates the bottom portion 33 in the axial direction. The power receiving coil 210 is located on the lower surface of bottom portion 33. A coil lead wire (not illustrated) extending from power receiving coil 210 extends through through-hole 331 and is connected to the board 2. The lower surface of the bottom portion 33 on which the power receiving coil 210 is located is covered with a cover (not illustrated).

Figure 12:
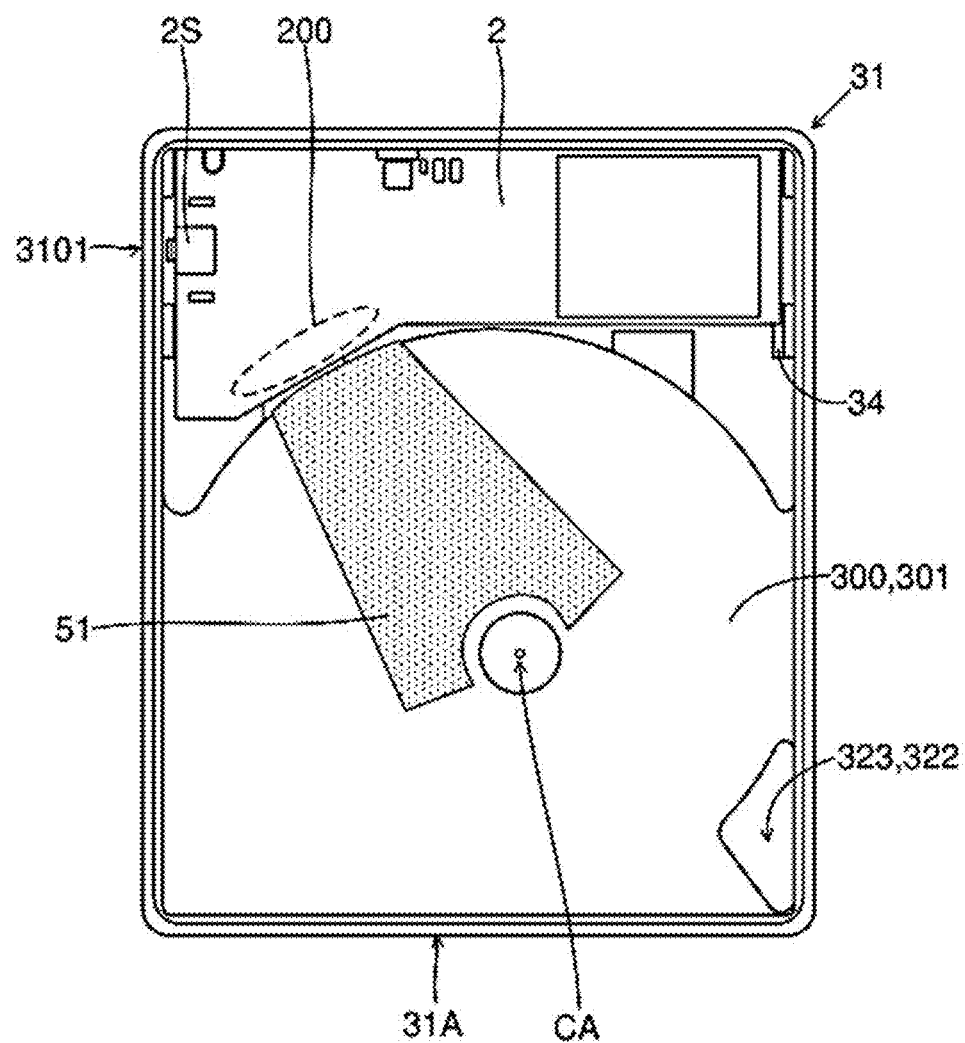
FIG. 12 is a plan view of the inside of the casing according to the first example embodiment as viewed from below.
Figure 13:
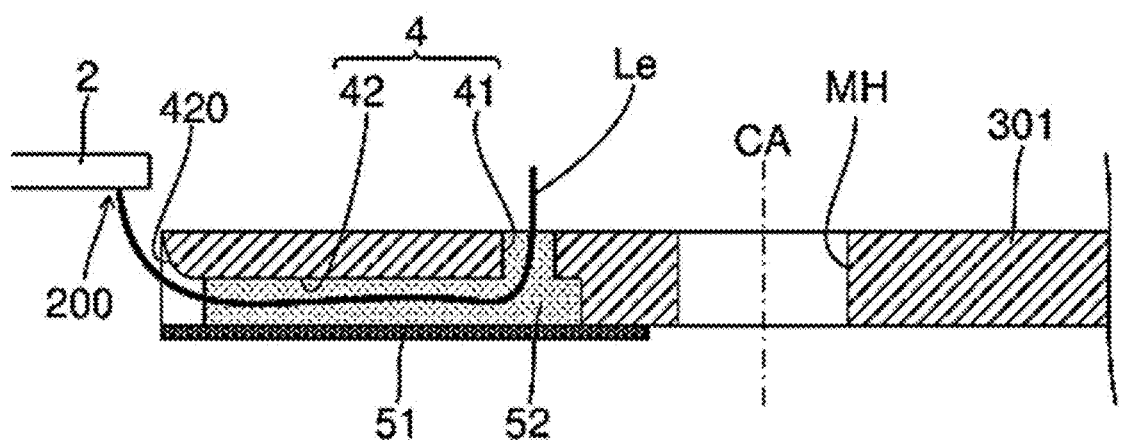
FIG. 13 is a cross-sectional view schematically illustrating the wiring structure of a lead wire according to the first example embodiment.

FIG. 12 is a plan view of the inside of the casing 3 according to the first example embodiment as viewed from below. FIG. 13 is a cross-sectional view schematically illustrating the wiring structure of the lead wire Le according to the first example embodiment.

The lead wire Le of the motor 1 is led out from the motor accommodation space 310 to the board accommodation space 320U. The lead wire Le is connected to the board 2. In order to lead out the lead wire Le, the casing 3 has the wiring portion 4 in the base portion 301. That is, the base portion 301 includes the wiring portion 4.

The wiring portion 4 is used for the wiring of the lead wire Le. In this case, the motor 1 has lead wires Le of the U phase, the V phase, and the W phase. That is, the motor 1 has a plurality of (three) lead wires Le.

The three lead wires Le are separately led out from the motor 1. Accordingly, the base portion 301 has the wiring portions 4 of the respective phases. That is, the base portion 301 includes a plurality of (three) wiring portions 4. The structures of the three wiring portions 4 are the same as each other. Accordingly, hereinafter, the structure will be described focusing on the wiring portion 4 of a certain phase, and a description of the structures of the wiring portions 4 of the other phases will be omitted.

The wiring portion 4 has a lead-out port 41. The lead-out port 41 penetrates the base portion 301 in the axial direction. The opening shape of the lead-out port 41 is not particularly limited. The opening shape of the lead-out port 41 is, for example, a circular shape.

The wiring portion 4 has a guide groove 42. The guide groove 42 is recessed upward from the lower surface of the base portion 301. The guide groove 42 may be recessed in a rectangular shape (including a substantially rectangular shape) or may be recessed in an arc shape. The guide groove 42 extends radially outward from the lead-out port 41. In the following description, an end portion of the guide groove 42 which is located on the lead-out port 41 side is defined as a start end.

In this case, the guide groove 42 extends toward the board accommodation space 320U and faces the board accommodation space 320U. That is, the guide groove 42 has the termination 420 at the radially outer end of the base portion 301 and communicates with the board accommodation space 320U.

The lead wire Le is led out from the lead-out port 41. The lead wire Le extends through the lead-out port 41 and extends from the upper side to the lower side of the base portion 301. In other words, a part of the lead wire Le is located in the lead-out port 41.

The lead wire Le is located in the guide groove 42 and extends radially outward along the guide groove 42. A termination 420 of the guide groove 42 communicates with the board accommodation space 320U. Accordingly, extending the lead wire Le radially outward along the guide groove 42 can easily lead out the lead wire Le to the board accommodation space 320U. That is, the lead wire Le can be easily connected to the board 2.

In this case, the casing 3 further includes a tape portion 51 and a seal 52. As the tape portion 51, for example, an insulating tape using PET as a base material can be used. The seal 52 is, for example, a resin-based material.

The tape portion 51 is bonded to the lower surface of the base portion 301. This makes the tape portion 51 cover at least a part of the wiring portion 4 from below. The tape portion 51 covers the entire area of the lead-out port 41 when viewed from below. The tape portion 51 covers the entire guide groove 42 when viewed from below.

The seal 52 is located in at least a part of a space defined by the wiring portion 4 and the tape portion 51. More specifically, with the tape portion 51 bonded to the lower surface of the base portion 301, the space defined by the wiring portion 4 and the tape portion 51 is filled with the constituent material of the seal 52. As a result, the seal 52 is located in at least a part of the space defined by the wiring portion 4 and the tape portion 51.

This configuration can suppress the intrusion of moisture, dust, and the like from lower accommodation space 320L into motor accommodation space 310. The configuration also suppress the intrusion of moisture, dust, and the like from the motor accommodation space 310 into the lower accommodation space 320L.

In the configuration in which the tape portion 51 is bonded to the lower surface of the base portion 301 and at least a part of the wiring portion 4 is covered with the tape portion 51 from below, the filling region of the constituent material of the seal 52 is regulated by the tape portion 51 when the constituent material of the seal 52 is filled. In other words, the constituent material of the seal 52 can be prevented from protruding downward from the lower surface of the tape portion 51. In other words, it is possible to prevent the seal 52 from protruding toward the lower accommodation space 320L which is a space below the base portion 301.

Accordingly, even if the lower accommodation space 320L is not expanded in the axial direction, it is possible to suppress the elements accommodated in the lower accommodation space 320L from coming into contact with the seal 52. This makes it possible to reduce the axial width of the motor module 100. That is, it is possible to reduce the thickness of the motor module 100. In addition, it is possible to reduce the thickness of the motor module 100 used as a centrifugal fan having the impeller 10 attached to the motor 1.

In this configuration, since the seal 52 can be suppressed from protruding toward the lower accommodation space 320L, the lower accommodation space 320L can be effectively used. In this case, the battery 400 is accommodated in the lower accommodation space 320L. When the battery 400 is accommodated in the lower accommodation space 320L, contact between the battery 400 and the seal 52 can be suppressed without reducing the size of the battery 400. The capacity of the battery 400 increases as the size increases. This makes it possible to provide the motor module 100 which increases the operating time for one charge.

The plurality of (three) lead wires Le are led out from the lead-out ports 41 of the wiring portions 4 different from each other. That is, the lead wires Le of the respective phases are led out from the lead-out ports 41 of the wiring portions 4 different from each other. The lead wires Le of the respective phases are arranged in the guide grooves 42 of the wiring portions 4 different from each other. The lead wires Le of the respective phases extend radially outward along the guide grooves 42 of the wiring portions 4 different from each other and reach the board accommodation space 320U.

This makes it possible to prevent the plurality of lead wires Le (of the respective phases) from coming into contact with each other. In addition, leading out the plurality of lead wires Le (of the respective phases) from the different lead-out ports 41 makes it possible to suppress wiring errors.

The number of tape portions 51 attached to the lower surface of the base portion 301 is one. In other words, one tape portion 51 is shared by the plurality of wiring portions 4. In other words, the tape portion 51 alone covers at least a part of each of the plurality of wiring portions 4 from below. This eliminates the need to prepare a plurality of tape portions 51 for one motor module 100, thereby reducing the number of components for one motor module 100.

In this case, if the lead wire Le extending from the motor 1 can be led out to the board accommodation space 320U in the shortest route, it is not necessary to make a large wiring space for the lead wire Le. Accordingly, the guide groove 42 extends along a straight line connecting the connection portion 200 of the board 2 and the lead-out port 41 when viewed from the axial direction. In other words, the guide groove 42 linearly extends radially outward from the lead-out port 41 when viewed from the axial direction. Accordingly, the lead wire Le can be guided to the connection portion 200 of the board 2 in the shortest route. This can shorten the lead wire Le. In addition, since the lead wire Le is short, wiring work of the lead wire Le is facilitated.

The board 2 has the connection portion 200 in the protruding portion 22. The protruding portion 22 is located in the motor outer peripheral space 322. That is, the connection portion 200 is located in the motor outer peripheral space 322. In this configuration, the guide groove 42 extends linearly from the lead-out port 41 toward the motor outer peripheral space 322 as viewed from the axial direction. Disposing the connection portion 200 in the motor outer peripheral space 322 makes it possible to effectively use the main portion 21 located in the opposite side space 321 of the board 2.

In addition, the termination 420 of the guide groove 42 has a shape inclined upward toward the board accommodation space 320U. The inclined shape of the termination 420 is not particularly limited. The termination 420 may be inclined in a curved shape or may be inclined in a linear shape. Accordingly, since the termination 420 of the guide groove 42 has no sharp edge, it is possible to lead out the lead wire Le from the guide groove 42 to the board accommodation space 320U without bringing the lead wire Le into contact with the sharp edge.

Figure 14:
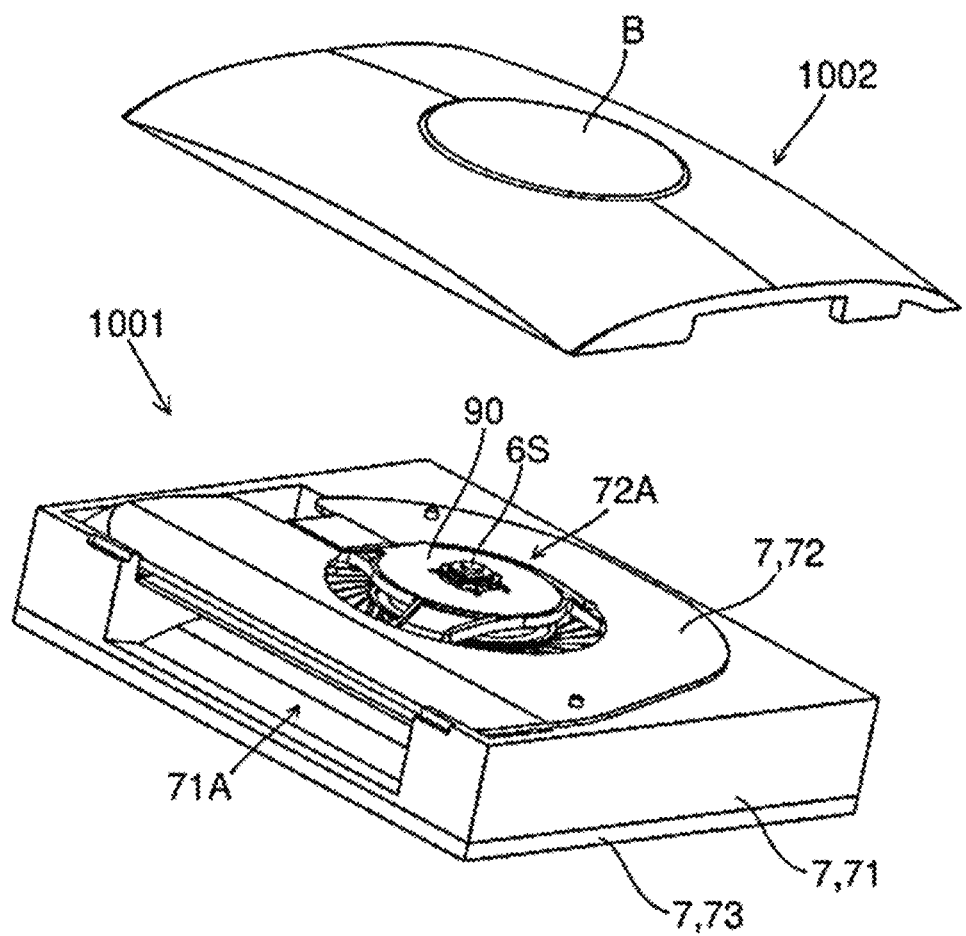
FIG. 14 is a perspective view of a motor module according to a second example embodiment of the present invention.
Figure 15:
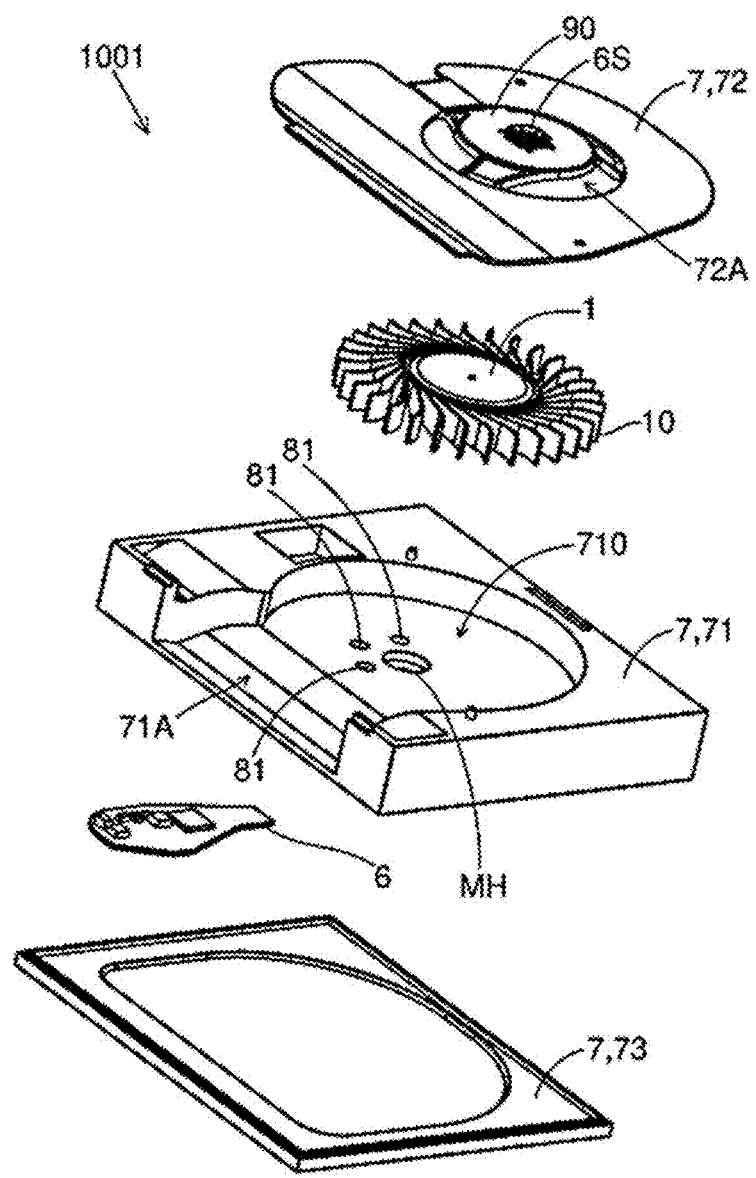
FIG. 15 is an exploded perspective view of the motor module according to the second example embodiment.
Figure 16:
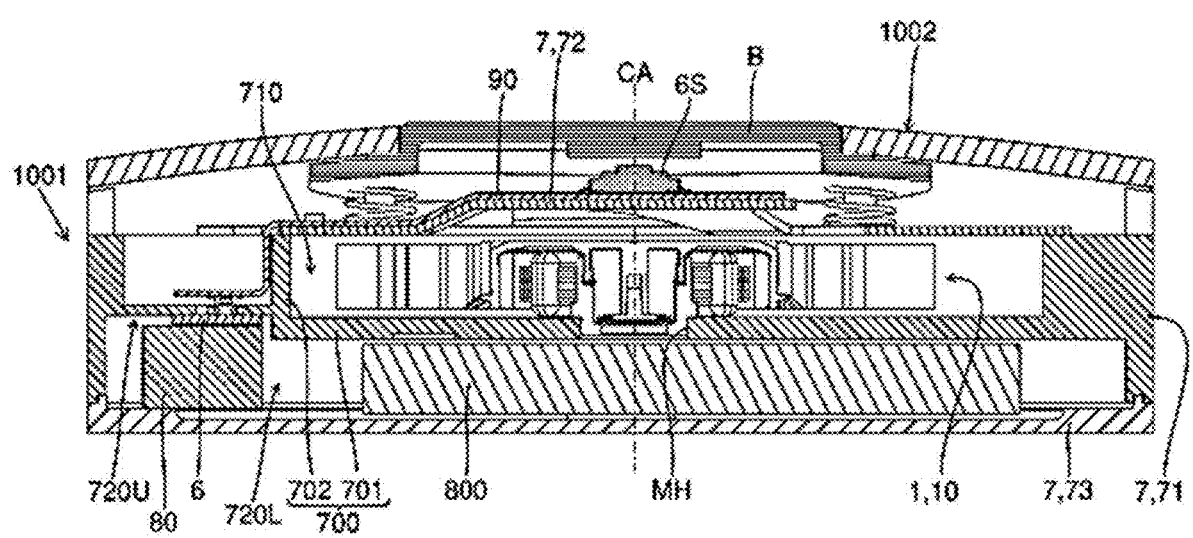
FIG. 16 is a cross-sectional view of the motor module according to the second example embodiment.

FIG. 14 is a perspective view of a motor module 1001 according to the second example embodiment. FIG. 14 also illustrates an operation unit 1002 mounted on the motor module 1001. FIG. 15 is a perspective view of the motor module 1001 according to the second example embodiment. FIG. 16 is a cross-sectional view of the motor module 1001 according to the second example embodiment.

The motor module 1001 according to the second example embodiment is a centrifugal fan as in the first example embodiment. That is, the motor module 1001 is a blower apparatus.

For example, the motor module 1001 is attached to clothing. The motor module 1001 is driven to circulate the air, thereby exhausting the air in the clothing to the outside of the clothing. This can release heat in the clothing to the outside of the clothing. When the motor module 1001 is attached to clothing, it is necessary to reduce the thickness of the motor module 1001 in order not to impair the design of the clothing.

The motor module 1001 according to the second example embodiment includes a motor 1 and an impeller 10 similar to those of the first example embodiment. A detailed description of the motor 1 and the impeller 10 according to the second example embodiment will be omitted by citing the description of the motor 1 and the impeller 10 according to the first example embodiment.

The motor module 1001 includes a board 6. The motor module 1001 includes an FPC 90. The FPC 90 is a flexible printed circuit. The board 6 controls the motor 1. The FPC 90 includes electronic components such as a switch 6S. Since the switch 6S according to the second example embodiment has the same function as that of the switch 2S according to the first example embodiment, a detailed description of the switch 6S will be omitted by citing the description of the switch 2S according to the first example embodiment.

The board 6 switches between driving and stopping (that is, rotation and non-rotation of the impeller 10) of the motor 1 based on on/off of the switch 6S. Accordingly, the board 6 is connected to the FPC 90.

The motor module 1001 includes a battery 800. The battery 800 supplies power to the motor 1. The board 6 controls power supply from the battery 800 to the motor 1.

The motor module 1001 includes a casing 7. The casing 7 has an accommodation space 70. The accommodation space 70 will be described in detail later. The casing 7 includes a case body 71, a lid portion 72, and a bottom portion 73. The lid portion 72 is located above the case body 71 and closes the accommodation space 70 from above. The bottom portion 73 is located below the case body 71 and closes the accommodation space 70 from below.

The casing 7 accommodates the motor 1. That is, the casing 7 accommodates the impeller 10. The casing 7 accommodates the board 6. In addition, the casing 7 accommodates the battery 800.

In this case, the FPC 90 is located on the upper surface of the lid portion 72. The switch 6S is then pressed from the upper side to the lower side to switch on and off. Accordingly, the operation unit 1002 is located above the lid portion 72. The operation unit 1002 has a button B that moves downward by being pressed from above. The switch 6S is located at a position where the switch 6S can come into contact with the lower surface of the button B. When the button B is pressed, the switch 6S comes into contact with the lower surface of the button B. When the button B is pressed, the switch 6S is pressed downward to switch on and off.

Figure 17:
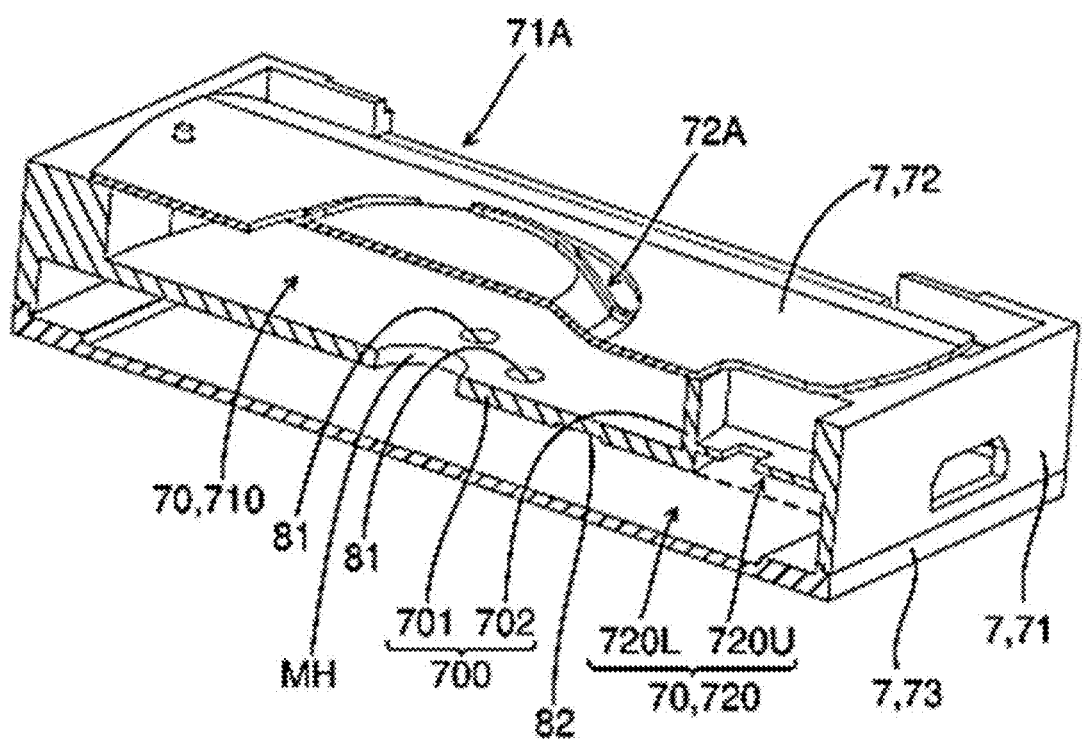
FIG. 17 is a cross-sectional perspective view of a casing according to the second example embodiment.

FIG. 17 is a cross-sectional perspective view of the casing 7 according to the second example embodiment. Referring to FIG. 17, the broken line indicates the boundary between an upper accommodation space 720U and a lower accommodation space 720L in the accommodation space 70 of the casing 7.

The casing 7 has a partition wall portion 700 that partitions the accommodation space 70 into a plurality of sections. The accommodation space 70 is partitioned into a plurality of spaces by the partition wall portion 700.

More specifically, the accommodation space 70 has a first accommodation space 710 that accommodates the motor 1. In other words, the casing 7 has the first accommodation space 710 that accommodates the motor 1 and the impeller 10. The first accommodation space 710 corresponds to a "motor accommodation space". In the following description, the first accommodation space 710 is referred to as the motor accommodation space 710.

The casing 7 has an inlet port 72A that opens in the axial direction of the impeller 10. The inlet port 72A opens, for example, above the impeller 10. The inlet port 72A is formed in the lid portion 72. The casing 7 also has an exhaust port 71A that opens radially outward of the impeller 10. When viewed radially outward, an opening is formed by the recess of the motor accommodation space 710 and the lid portion 72, and the opening is the exhaust port 71A.

The accommodation space 70 includes a second accommodation space 720. The second accommodation space 720 includes at least a space below the motor accommodation space 710. A space between the motor accommodation space 710 and the second accommodation space 720 in the axial direction is partitioned by the partition wall portion 700. More specifically, the partition wall portion 700 includes a base portion 701. The base portion 701 partitions the motor accommodation space 710 and the second accommodation space 720 in the axial direction. That is, the casing 7 has the partition wall portion 700 that partitions the motor accommodation space 710.

The base portion 701 according to the second example embodiment has a motor holding hole MH similarly to the base portion 301 according to the first example embodiment. A detailed description of the base portion 701 according to the second example embodiment will be omitted by citing the description of the base portion 701 according to the first example embodiment.

The second accommodation space 720 has an upper accommodation space 720U. The upper accommodation space 720U is a space radially outward of the motor accommodating space 710 and is a space axially above the lower surface of the base portion 701. The second accommodation space 720 has a lower accommodation space 720L. The lower accommodation space 720L includes a space below the upper accommodation space 720U and a space below the base portion 701.

A space between the motor accommodation space 710 and the upper accommodation space 720U in the axial direction is partitioned by the partition wall portion 700. More specifically, the partition wall portion 700 includes a vertical wall portion 702. The vertical wall portion 702 is erected from the base portion 701. The vertical wall portion 702 partitions the motor accommodation space 710 and the upper accommodation space 720U from each other in the radial direction. Accordingly, the motor accommodation space 710 is partitioned by the partition wall portion 700 when viewed from the axial direction.

The board 6 is accommodated in the second accommodation space 720. More specifically, the board 6 is accommodated in the upper accommodation space 720U. The battery 800 is located in the lower accommodation space 720L. The battery 800 is located below the base portion 701 in the lower accommodation space 720L. The battery 800 is fixed to the upper surface of the bottom portion 73. In the second example embodiment, since the battery 800 is accommodated in the lower accommodation space 720L, it is possible to obtain the effect of increasing the capacity of the battery 800 as in the first example embodiment.

The upper accommodation space 720U corresponds to the "board accommodation space". In the following description, the upper accommodation space 720U is referred to as the board accommodation space 720U.

In this case, the board accommodation space 720U is a space radially outward of the motor accommodation space 710. The motor accommodation space 710 and the board accommodation space 720U are arranged in the radial direction through the partition wall portion 700 when viewed from the axial direction. In other words, the accommodation space 70 has the board accommodation space 720U that accommodates the board 6. The board accommodation space 720U is positioned radially outward of the motor accommodation space 710 when viewed from the axial direction.

Accordingly, in the second example embodiment, since the motor 1 and the board 2 are aligned in the radial direction, it is possible to obtain the effect of thinning the motor module 1001 as in the first example embodiment. That is, the motor module 1001 used as the centrifugal fan having the impeller 10 attached to the motor 1 can be thinned.

Figure 18:
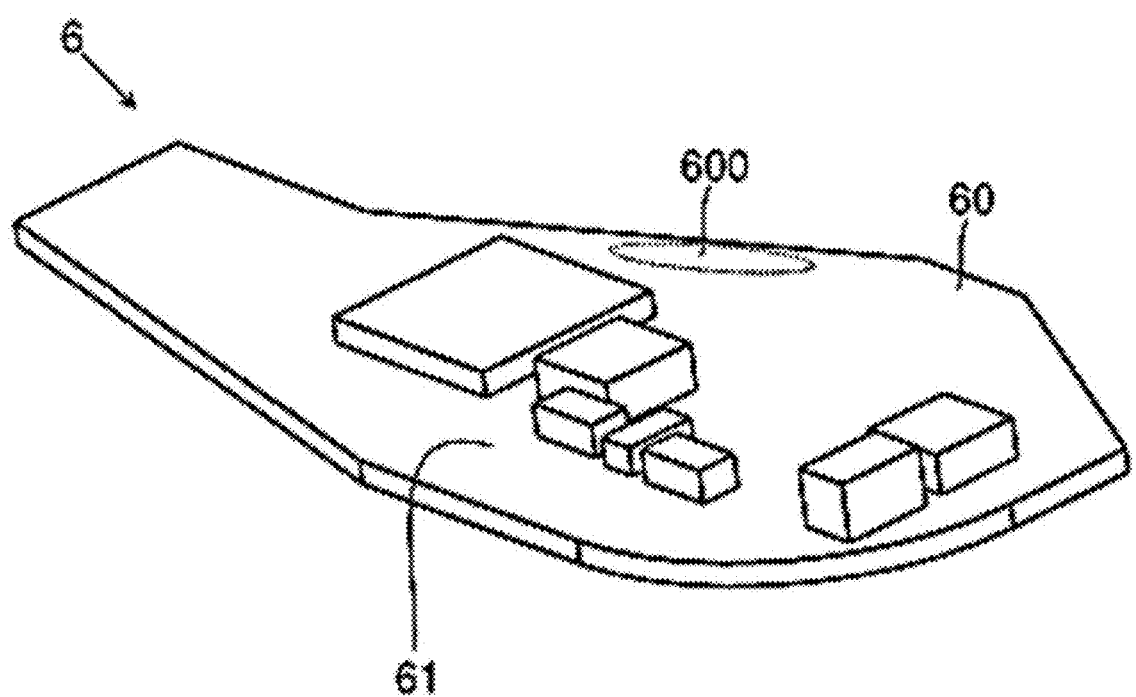
FIG. 18 is a perspective view of a board according to the second example embodiment.
Figure 19:
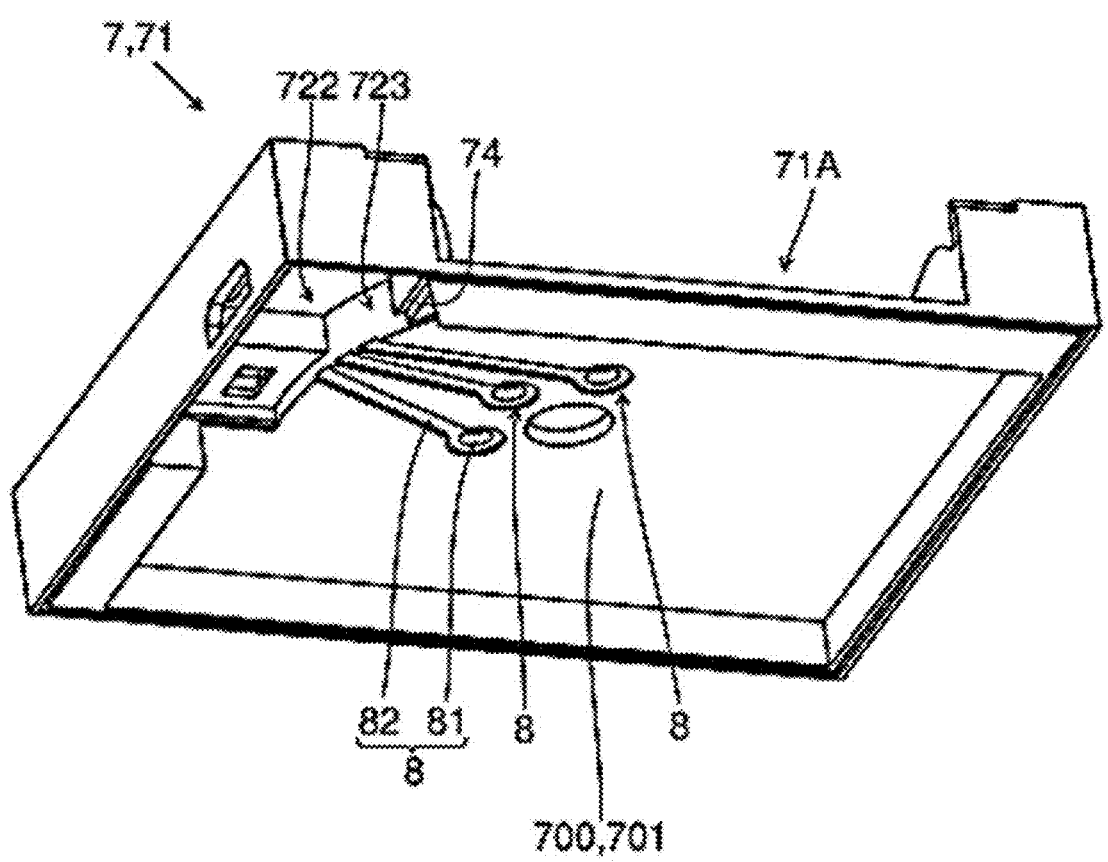
FIG. 19 is a perspective view of a case body according to the second example embodiment as viewed from below.
Figure 20:
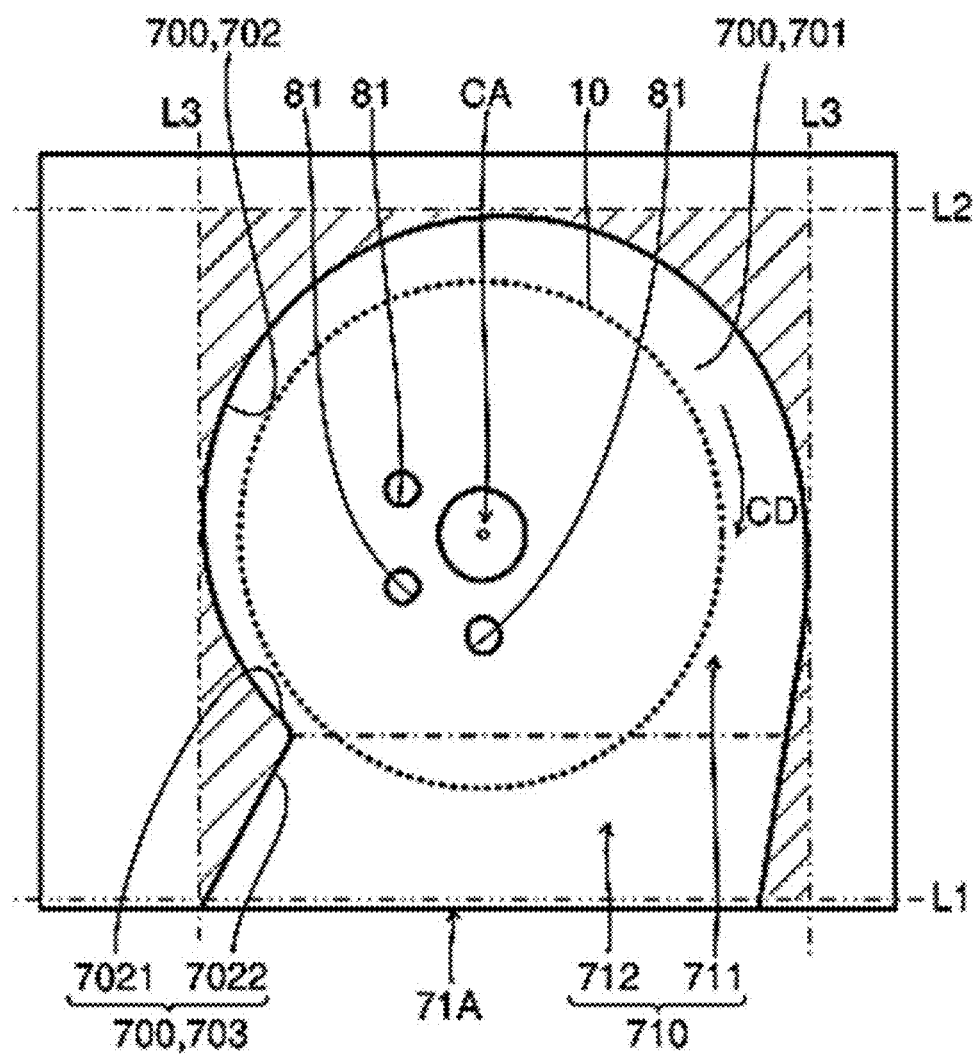
FIG. 20 is a plan view of the case body according to the second example embodiment as viewed from above.
Figure 21:
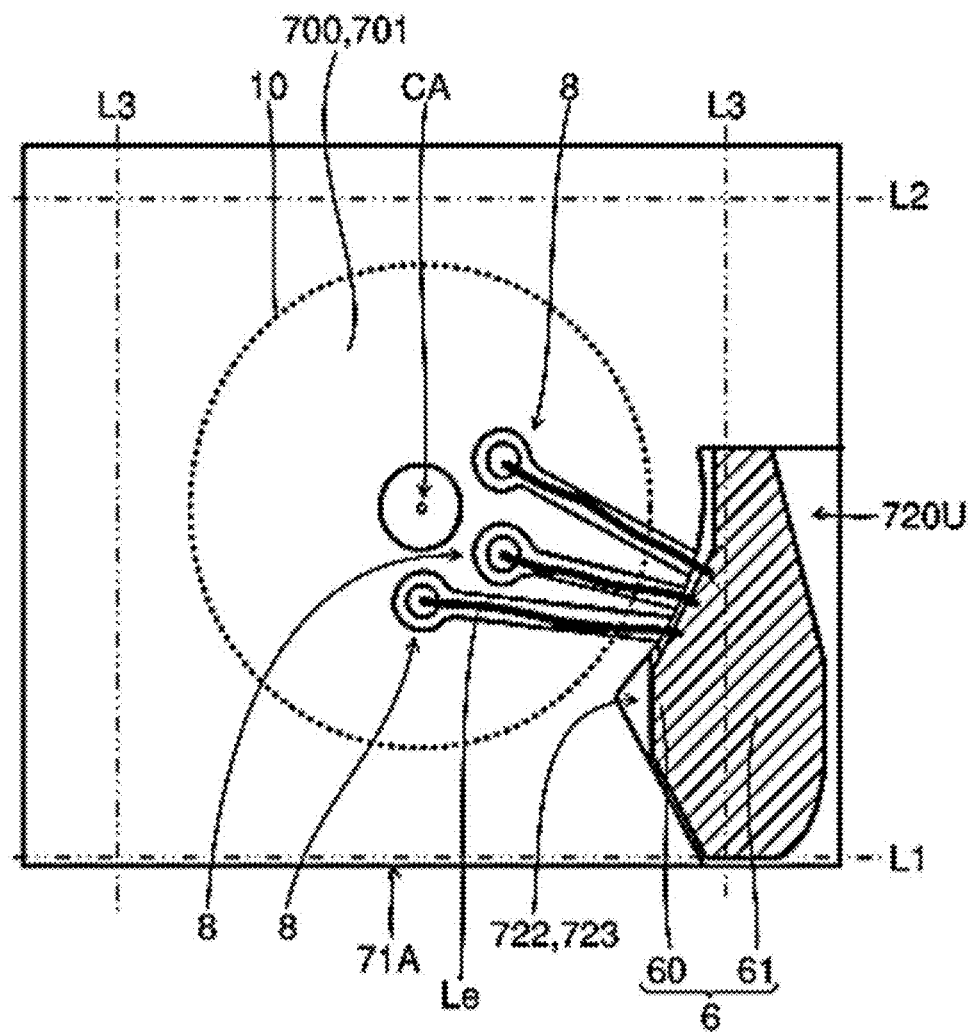
FIG. 21 is a plan view of a state in which a board is located on the case body according to the second example embodiment as viewed from below.

FIG. 18 is a perspective view of the board 6 according to the second example embodiment. FIG. 19 is a perspective view of the case body 71 according to the second example embodiment as viewed from below. FIG. 20 is a plan view of the case body 31 according to the second example embodiment as viewed from above. Referring to FIG. 20, the outer peripheral edge of the impeller 10 is indicated by the circular broken line, and the flow path of air caused by the rotation of the impeller 10 is indicated by an arrow CD. Air flows in the direction indicated by the arrow CD. That is, the impeller 10 rotates in the direction indicated by the arrow CD. FIG. 21 is a plan view of a state in which the board 6 is located on the case body 71 according to the second example embodiment as viewed from below.

The motor accommodation space 710 has spaces 711 and 712. The spaces 711 and 722 according to the second example embodiment correspond to the spaces 311 and 312 according to the first example embodiment, respectively. Accordingly, a description of the spaces 711 and 712 according to the second example embodiment will be omitted by citing the description of the spaces 311 and 312 according to the first example embodiment. Referring to FIG. 20, the boundary between the space 711 and the space 712 when viewed from above is indicated by the one-dot chain line.

The partition wall portion 700 partitioning the motor accommodation space 710 has a tongue portion 703. The tongue portion 703 according to the second example embodiment corresponds to the tongue portion 303 according to the first example embodiment. A first wall portion 7021 and a second wall portion 7022 according to the second example embodiment correspond to the first wall portion 3021 and the second wall portion 3022 according to the first example embodiment, respectively. Like the tongue portion 303 according to the first example embodiment, the tongue portion 703 according to the second example embodiment is formed by a first wall portion 7021 and a second wall portion 7022 when viewed from above. A detailed description of the tongue portion 703 according to the second example embodiment will be omitted by citing the description of the tongue portion 303 according to the first example embodiment.

The outer shape of the casing 7 has four side surfaces when viewed from the axial direction. The exhaust port 71A is formed in one of the four surfaces. In the following description, a direction parallel to a surface having the exhaust port 71A among the four side surfaces when the casing 7 is viewed from the axial direction is defined as a left-right direction.

A straight line L1 passing through the left and right end portions of the exhaust port 71A when viewed from the axial direction is defined as a first virtual straight line. A straight line L2 that is parallel to the first virtual straight line L1 and is in contact with the partition wall portion 700 on the opposite side of the central axis CA to the exhaust port 71A is defined as a second virtual straight line L2. A straight line L3 perpendicular to the first virtual straight line L1 and in contact with the partition wall portion 700 on each of the left and right sides of the central axis CA is defined as a third virtual straight line. Referring to FIGS. 20 and 21, the first virtual straight line L1, the second virtual straight line L2, and the third virtual straight line L3 are indicated by the two-dot chain lines.

At least a part of the board accommodation space 720U is provided in a motor outer peripheral space 722 surrounded by the first virtual straight line L1, the second virtual straight line L2, the third virtual straight line L3, and the partition wall portion 700 when viewed from the axial direction. At least a part of the board 6 is located in the motor outer peripheral space 722. As a result, the motor outer peripheral space 722 can be effectively used. In other words, the mounting area of the board 6 can be increased without increasing the size of the motor module 1001. Referring to FIG. 20, when viewed from the axial direction, the space surrounded by the first virtual straight line L1, the second virtual straight line L2, the third virtual straight line L3, and the partition wall portion 700 is indicated by the hatching.

In this case, the motor outer peripheral space 722 has a tongue space 723. The tongue space 723 is a space protruding toward the motor accommodation space 710 on the exhaust port 71A side with respect to the central axis CA when viewed from the axial direction. The tongue space 723 is a space located on the reverse surface side of the tongue portion 703 and has a shape reflecting the shape of the tongue portion 703.

The board 6 has a board tongue portion 60 located in the tongue space 723. The board 6 has a portion protruding from the main portion 61 to the tongue space 723 as the board tongue portion 60. Disposing a part of the board 6 (that is, the board tongue portion 60) in the tongue space 723 can increase the mounting area of the board 6.

At least a part of the base plate tongue portion 60 has a shape along the inner edge of the tongue space 723 when viewed from the axial direction. This makes it possible to enlarge the board tongue portion 60. That is, the mounting area of the board 6 can be further increased. Note that the shape along the inner edge of the tongue space 723 does not necessarily indicate only a shape along strictly parallel to the inner edge of the tongue space 723. For example, the curved portion of the tongue space 723 may be parallel to a tangent to the curved portion when viewed from the axial direction.

The board tongue portion 60 is used for positioning the board 6 in the axial direction. More specifically, the casing 7 has a positioning portion 74 in contact with the upper surface of the board 6 in the tongue space 723. In this configuration, the positioning portion 74 comes into contact with the board tongue portion 60. This makes it possible to effectively use a portion of the board 6 which is different from the board tongue portion 60. The positioning portion 74 may also be located at a different location in the board accommodation space 720U.

Note that the motor module 1001 includes a cushioning material 80 (see FIG. 16). The casing 7 has the bottom portion 73 below the tongue space 723. The cushioning material 80 is then located on the upper surface of the bottom portion 73 and is in contact with the lower surface of the board 6. As a result, since the board tongue portion 60 is held in contact with the positioning portion 74, it is possible to reliably suppress the positional shift of the board 6 in the axial direction. It is also possible to buffer an axial impact on the board 6.

The base portion 701 includes a wiring portion 8. The wiring portion 8 includes a lead-out port 81 that penetrates the base portion 701 in the axial direction and a guide groove 82 that is recessed upward from the lower surface of the base portion 701 and extends radially outward from the lead-out port 81. The lead wire Le of the motor 1 is led out from the lead-out port 81, located in the guide groove 82, and extends radially outward along the guide groove 82.

The wiring portion 8 according to the second example embodiment has the same structure as the wiring portion 4 according to the first example embodiment. Accordingly, a detailed description of the wiring portion 8 according to the second example embodiment will be omitted by citing the description of the wiring portion 4 according to the first example embodiment.

The board 6 has a connection portion 600 to which the lead wire Le is connected. The connection portion 600 is located on the lower surface of the board 6. The lead wire Le is led out to the board accommodation space 720U and connected to the connection portion 600. Referring to FIG. 18, the lower surface of the board 6 is not illustrated. For this reason, a portion of the upper surface of the board 6 which overlaps the connection portion 600 in the axial direction is surrounded by the broken line to clarify the position of the connection portion 600.

In this case, at least a part of the connection portion 600 is located on the board tongue portion 60. Accordingly, at least one guide groove 82 extends linearly from the lead-out port 81 toward the board tongue portion 60. Disposing at least a part of the connection portion 600 on the board tongue portion 60 allows the effective use of a portion of the board 6 which is different from the board tongue portion 60.

Although not illustrated, the casing 7 according to the second example embodiment further includes a tape portion 51 and a seal 52 similarly to the casing 3 according to the first example embodiment. The tape portion 51 is bonded to the lower surface of the base portion 701. This makes the tape portion 51 cover at least a part of the wiring portion 4 from below. The seal 52 is located in at least a part of a space defined by the wiring portion 8 and the tape portion 51.

Accordingly, the second example embodiment can obtain the same effects as those of the first example embodiment. That is, it is possible to suppress the intrusion of moisture, dust, and the like from lower accommodation space 720L into motor accommodation space 710. It is also possible to suppress the intrusion of moisture, dust, and the like from the motor accommodation space 710 into the lower accommodation space 720L.

In addition, since it is possible to prevent the seal 52 from protruding toward the lower accommodation space 720L which is a space below the base portion 701, it is possible to prevent an element to be accommodated in the lower accommodation space 720L from coming into contact with the seal 52 without expanding the lower accommodation space 720L in the axial direction. This makes it possible to reduce the axial width of the motor module 1001. That is, it is possible to reduce the thickness of the motor module 1001. In addition, it is possible to reduce the thickness of the motor module 1001 used as a centrifugal fan having the impeller 10 attached to the motor 1.

Another example embodiment of a blower according to the present invention includes an impeller that rotates around a central axis, a motor that rotates the impeller, and a housing that accommodates the impeller and the motor. The housing includes a circumferential wall portion and a lid wall portion. The circumferential wall portion is located radially outside with respect to the impeller and extends in an axial direction. The lid wall portion covers one axial direction side of the impeller. The circumferential wall portion includes a protruding portion protruding to the one axial direction side. The protruding portion is located on the one axial direction side with respect to an end surface on the one axial direction side of the lid wall portion. As a result, it is possible to provide the blower capable of preventing the impeller from being damaged.

Another example embodiment of a blower according to the present invention includes an impeller that rotates around a central axis, a motor that rotates the impeller, and a housing that accommodates the impeller and the motor. The housing includes a circumferential wall portion and a lid wall portion. The circumferential wall portion is located radially outside with respect to the impeller and extends in an axial direction. The lid wall portion covers one axial direction side of the impeller. The lid wall portion has an intake port, a flat plate portion, and a connecting portion. The intake port penetrates in the axial direction. The flat plate portion is located on the central axis and covers a portion of the intake port. The connecting portion extends radially outside from the flat plate portion and connects the flat plate portion to a circumferential edge portion of the intake port. In the lid wall portion, the flat plate portion or the circumferential edge portion is located at a position farthest from the impeller in the axial direction. As a result, it is possible to provide the blower capable of preventing the impeller from being damaged.

Another preferred embodiment of a blower according to the present invention includes a protruding portion located radially outside with respect to the lid wall portion and extends in a circumferential direction so as to surround at least a portion of the lid wall portion. The protruding portion is formed in an annular shape sandwiching an opening portion, and a central angle of the opening portion is less than 180 degrees. The circumferential wall portion and the lid wall portion are defined by separate structures. The circumferential wall portion includes a protrusion located radially inside with respect to the protruding portion and protruding in the axial direction from an end surface on the one axial direction side, and the lid wall portion includes a fitting portion fitted with the protrusion. An end surface on the one axial direction side of the protruding portion is located on the one axial direction side with respect to the protrusion.

In another preferred embodiment of a blower according to the present invention, the connecting portion is inclined to the one axial direction side toward the radially inner side. The circumferential edge portion is inclined to the one axial direction side toward the radially inner side. The connecting portion includes a rib protruding in the axial direction from a circumferential end portion of the connecting portion and extending in a radial direction. The blower further includes a switch that is located on an end surface on the one axial direction side of the lid wall portion and changes a rotation speed of the motor. The switch includes a switch sensor located on an end surface on the one axial direction side of the flat plate portion. The switch sensor is connected to a circuit board via a connector, the circuit board is connected to the motor, and the connector extends to the outside of the lid wall portion passing over an end surface on the one axial direction side of the connecting portion.

The example embodiment of the present disclosure is described as above. Note that the scope of the present disclosure is not limited to the above-described example embodiment. The present disclosure can be implemented with various modifications within a scope not departing from the gist of the disclosure. Further, the above-described example embodiment can be appropriately and optionally combined.

The present disclosure can be used for, for example, centrifugal fans attached to shoes, clothes, and the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor module comprising:
   a motor that is rotatable about a central axis extending vertically;
   a casing including an accommodation space;
   a board to control the motor; and
   a battery: wherein
   the motor includes a lead wire;
   the casing includes a partition wall that partitions the accommodation space into a plurality of sections;
   the plurality of sections includes a first accommodation space that accommodates the motor and a second accommodation space including at least a space below the first accommodation space;
   the partition wall includes a base that partitions the first accommodation space and the second accommodation space in an axial direction extending parallel to the central axis;
   the base includes a wiring portion;
   the wiring portion includes a lead-out port axially penetrating the base;
   the board is accommodated in the second accommodation space;
   the board includes a connection to which the lead wire is connected;
   the second accommodation space includes an upper accommodation space that is a space radially outward from the first accommodation space and axially above a lower surface of the base, and a lower accommodation space including a space below the upper accommodation space and a space below the base;
   the board is accommodated in the upper accommodation space; and
   the battery is located in the lower accommodation space.

2. The motor module according to claim 1, wherein
   the motor includes a plurality of lead wires including the lead wire;
   the base includes a plurality of wiring portions including the wiring portion; and
   the plurality of lead wires are respectively led out from different ones of a plurality of lead-out ports including the lead-out port of the plurality of wiring portions.

3. The motor module according to claim 1, wherein
   the wiring portion includes a guide groove with a termination at a radially outer end of the base and communicating with the upper accommodation space; and
   the termination of the guide groove has a shape inclined upward toward the upper accommodation space.

4. The motor module according to claim 1, wherein the casing includes a positioner in contact with an upper surface of the board in the upper accommodation space.

5. The motor module according to claim 4, further comprising:
   a cushioning material; wherein
   the casing includes a bottom below the upper accommodation space; and
   the cushioning material is located on an upper surface of the bottom and is in contact with a lower surface of the board.

6. The motor module according to claim 1, further comprising:
   an impeller that is rotatable integrally with the motor; wherein
   the casing includes an inlet port that opens in the axial direction and an exhaust port that opens radially outward.

* * * * *